(12) United States Patent
Qiu

(10) Patent No.: US 11,076,644 B2
(45) Date of Patent: Aug. 3, 2021

(54) BATTERY DEVICE AND ELECTRONIC CIGARETTE HAVING THE BATTERY DEVICE

(71) Applicant: JOYETECH EUROPE HOLDING GMBH, Zug (CH)

(72) Inventor: Weihua Qiu, Changzhou (CN)

(73) Assignee: JOYETECH EUROPE HOLDING GMBH, Zug (CH)

(*) Notice: Subject to any disclaimer, the term of this patent is extended or adjusted under 35 U.S.C. 154(b) by 447 days.

(21) Appl. No.: 16/029,532

(22) Filed: Jul. 6, 2018

(65) Prior Publication Data

US 2018/0310628 A1    Nov. 1, 2018

Related U.S. Application Data

(63) Continuation of application No. PCT/CN2017/078372, filed on Mar. 28, 2017.

(30) Foreign Application Priority Data

Mar. 31, 2016   (CN) .......................... 201610197126.1
Mar. 31, 2016   (CN) .......................... 201610197619.5
(Continued)

(51) Int. Cl.
   *A24F 47/00*        (2020.01)
   *A24F 40/46*        (2020.01)
(Continued)

(52) U.S. Cl.
   CPC .............. *A24F 40/46* (2020.01); *A24F 13/02* (2013.01); *A24F 40/44* (2020.01); *A24F 40/485* (2020.01);
(Continued)

(58) Field of Classification Search
   CPC ............................... A24F 40/40; A24F 47/008
   See application file for complete search history.

(56) References Cited

U.S. PATENT DOCUMENTS

2014/0299140 A1* 10/2014 Liu ....................... A61M 15/06
                                                                               131/329
2015/0237917 A1    8/2015   Lord .................................. 47/8

FOREIGN PATENT DOCUMENTS

CN         102869403 A      1/2013
CN         203446531 U      2/2014
(Continued)

OTHER PUBLICATIONS

The International Search Report of corresponding International PCT Application No. PCT/CN2017/078372, dated Jul. 12, 2017.
(Continued)

*Primary Examiner* — Eric Yaary
(74) *Attorney, Agent, or Firm* — J.C. Patents

(57) ABSTRACT

A battery device for an electronic cigarette that comprises an atomizing device, the battery device comprising a housing with an accommodating inner cavity, a power supply assembly, a liquid storing assembly, and a connecting member, wherein the power supply assembly and the liquid storing assembly are both disposed within the accommodating inner cavity, the connecting member is disposed at an open end of the liquid storing assembly, allowing the atomizing device to be inserted into the liquid storing assembly through the open end and be detachably connected to the battery device through the connecting member. In the battery device of the present application, the liquid storing assembly is disposed therein, so that during an installation process, the user only needs to make one connection to complete the connection between the atomizing device, the battery device and the liquid storing assembly.

14 Claims, 32 Drawing Sheets

(30) Foreign Application Priority Data

Mar. 31, 2016 (CN) .................. 201610197621.2
Nov. 10, 2016 (CN) .................. 201621211439.X

(51) Int. Cl.
| | |
|---|---|
| *H01M 50/20* | (2021.01) |
| *H01M 50/213* | (2021.01) |
| *A24F 40/44* | (2020.01) |
| *A24F 40/485* | (2020.01) |
| *A24F 13/02* | (2006.01) |
| *H01M 10/42* | (2006.01) |
| *A24F 40/10* | (2020.01) |

(52) U.S. Cl.
CPC ......... *H01M 50/20* (2021.01); *H01M 50/213* (2021.01); *A24F 40/10* (2020.01); *H01M 10/425* (2013.01); *H01M 2220/30* (2013.01)

(56) References Cited

FOREIGN PATENT DOCUMENTS

| | | |
|---|---|---|
| CN | 203492786 U | 3/2014 |
| CN | 203523812 U | 4/2014 |
| CN | 203828084 U | 9/2014 |
| CN | 104207330 A | 12/2014 |
| CN | 104244749 A | 12/2014 |
| CN | 204032373 U | 12/2014 |
| CN | 204048024 U | 12/2014 |
| CN | 204169056 U | 2/2015 |
| CN | 204169057 U | 2/2015 |
| CN | 204232305 U | 4/2015 |
| CN | 204317489 U | 5/2015 |
| CN | 204409585 U | 6/2015 |
| CN | 204444248 U | 7/2015 |
| CN | 204466900 U | 7/2015 |
| CN | 204483017 U | 7/2015 |
| CN | 204599325 U | 9/2015 |
| CN | 105029709 A | 11/2015 |
| CN | 204796753 U | 11/2015 |
| CN | 204837999 U | 12/2015 |
| CN | 204861163 U | 12/2015 |
| CN | 204861176 U | 12/2015 |
| CN | 204949515 U | 1/2016 |
| CN | 204969456 U | 1/2016 |
| CN | 105286089 A | 2/2016 |
| CN | 205040657 U | 2/2016 |
| CN | 105394811 A | 3/2016 |
| CN | 105433447 A | 3/2016 |
| CN | 105559148 A | 5/2016 |
| CN | 105686088 A | 6/2016 |
| CN | 105707983 A | 6/2016 |
| CN | 105725278 A | 7/2016 |
| CN | 205547362 U | 9/2016 |
| CN | 205585321 U | 9/2016 |
| CN | 205695700 U | 11/2016 |
| CN | 205695701 U | 11/2016 |
| CN | 206260840 U | 6/2017 |
| KR | 10-1319228 | 10/2013 |
| WO | WO 2013/178769 A1 | 12/2013 |

OTHER PUBLICATIONS

The Chinese First Examination Report of corresponding China patent application No. 201610197126.1, dated Dec. 29, 2017.
The Chinese First Examination Report of corresponding China patent application No. 201610197619.5, dated Dec. 25, 2017.
The Chinese First Examination Report of corresponding China patent application No. 201610197621.2, dated Dec. 26, 2017.

* cited by examiner

BATTERY DEVICE AND ELECTRONIC CIGARETTE HAVING THE BATTERY DEVICE

CROSS-REFERENCE TO RELATED APPLICATIONS

This application is a continuation of International Application No. PCT/CN2017/078372, filed on Mar. 28, 2017, which claims priority to Chinese Patent Application No. 201610197621.2, 201610197126.1, and 201610197619.5, filed on Mar. 31, 2016 and Application No. 201621211439.X, filed on Nov. 10, 2016. The disclosures of the aforementioned applications are hereby incorporated by reference in their entireties.

TECHNICAL FIELD

The application relates to the field of electronic cigarettes, and in particular, to a battery device and an electronic cigarette having the battery device.

BACKGROUND

Typically, a conventional electronic cigarette includes an atomizing device and a battery device. The battery device is typically designed to be an integrated module, while the atomizing device usually includes an atomizing head, a base and a liquid storing assembly. More often than not, the electronic cigarette is relatively complicated to be assembled. On the one hand, when the user assembles the electronic cigarette, one end of the base needs to be connected with the battery device through threads, and then the other end of the base is connected to the liquid storing assembly through threads. That is, two threaded connections have to be made. On the other hand, after long-term use, the thread wears, leading to loose connections between the base and the battery device, which in turn cause poor electrical contact between the atomizing head and the battery device. If the base and the liquid storing assembly are fixedly connected to reduce the number of connections to be made, the liquid storing assembly will become more difficult to clean because the base is often disposed with electrical connecting members.

An existing electronic cigarette is typically assembled out of two parts, namely, an atomizer and a battery part, where the atomizer typically includes a liquid storing assembly, an atomizing assembly, etc., which can be complicated for assembling. Moreover, when liquid injection is required, it often has to be done after detaching the atomizer from the battery part and uncapping the liquid storing assembly of the atomizer. Meanwhile, the battery part housing of some electronic cigarettes are substantially formed as cylinders or other prismatic shapes matching with the atomizer, hence the housing space of the battery part is sub-efficiently utilized.

In addition, many existing electronic cigarettes are not disposed with any child protecting device, hence a child who has reached an electronic cigarette can access the cigarette liquid in the liquid storing assembly after simple attempts, resulting in the children easily coming into contact with, or digesting, the cigarette liquid.

SUMMARY

Accordingly, it is necessary to provide a battery device that is simple to assemble and has a reliable connection.

It is also necessary to provide an electronic cigarette having such battery device.

A battery device for an electronic cigarette that comprises an atomizing device, the battery device comprising a housing with an accommodating inner cavity, a power supply assembly, a liquid storing assembly, and a connecting member, wherein the power supply assembly and the liquid storing assembly are both disposed within the accommodating inner cavity, the connecting member is disposed at an open end of the liquid storing assembly, allowing the atomizing device to be inserted into the liquid storing assembly through the open end and be detachably connected to the battery device through the connecting member.

In one of the embodiments, the liquid storing assembly comprises a liquid storing tube for storing cigarette liquid, and an electrode contacting member which is disposed at the bottom of the liquid storing tube, with one end extending through the bottom of the liquid storing tube into an inner cavity of the liquid storing tube to be electrically connected to the atomizing device, and with another end electrically connecting to the power supply assembly.

In one of the embodiments, the liquid storing assembly further includes a sealing member disposed between the bottom of the liquid storing tube and the electrode contacting member.

In one of the embodiments, the power supply assembly comprises a battery, a circuit board holder, a circuit board and a button assembly, wherein the circuit board is disposed on the circuit board holder and is electrically connected to the battery, and the button assembly is exposed outside the housing and is electrically connected to the circuit board.

In one of the embodiments, the circuit board is disposed with a USB socket, and the housing is disposed with a USB socket connecting hole adapted to the USB socket.

In one of the embodiments, the housing includes a shell and a bottom cover that is detachably or fixedly disposed on the shell, where the shell and the bottom cover define the accommodating inner cavity, and the battery is supported on the bottom cover.

In one of the embodiments, the power supply assembly further includes a battery pad disposed between the battery and the bottom cover.

In one of the embodiments, the shell is formed into a hollow tubular shape with both ends in perforation with each other.

In one of the embodiments, the connecting member is a threaded ring.

An electronic cigarette, comprising a battery device and an atomizing device, wherein the battery device is the battery devices described above.

The application also provides a battery device for an electronic cigarette that comprises an atomizing device. The battery device includes a liquid storing assembly, a housing with an accommodating inner cavity, and a power supply assembly disposed in the accommodating inner cavity. The liquid storing assembly comprises a liquid storing base and a liquid storing tube, wherein the liquid storing base comprises a fixed end and an open end opposite to the fixed end, wherein the fixed end is disposed to be fixedly connected within the accommodating inner cavity, the open end extends out of the accommodating inner cavity, and a bottom end of the liquid storing tube is pluggably sleeved at the open end, an end of the atomizing device is allowed to be inserted from a top end of the liquid storing tube into the liquid storing tube and be detachably connected to the open end.

Further, the liquid storing assembly further comprises a liquid storing seal, a mounting step formed between an outer surface of the open end and the fixed end, wherein the liquid storing seal is supported on the mounting step and sealed between a bottom end of the liquid storing tube and the open end.

Further, the liquid storing assembly further comprises a first electrode contacting assembly; the open end is formed by the top of the fixed end extending towards a direction away from the accommodating inner cavity; the open end and the fixed end collectively enclose to form an inner cavity for accommodating the first electrode contacting assembly; the first electrode contacting assembly is disposed on the fixed end, and wherein one end of the first electrode contacting assembly is extended into the inner cavity to be electrically connected to the atomizing device, and another end of the first electrode contacting assembly is extended into the accommodating inner cavity to be electrically connected to the power supply assembly.

Further, the power supply assembly comprises a battery, a circuit board holder, a circuit board and a button, wherein the battery, the circuit board holder and the circuit board are all accommodated in the accommodating inner cavity, and the circuit board is disposed on the circuit board holder, and is electrically connected to the battery, wherein one end of the button is exposed out of the housing, and another end of the button is located in the housing, and is electrically connected to the circuit board.

Further, the circuit board is disposed with a USB socket, and the housing is disposed with a USB socket connecting hole adapted to the USB socket.

Further, the inner surface of the open end is disposed with internal threads detachably connected to the atomizing device.

An electronic cigarette, comprising a battery device and an atomizing device, wherein the battery device is the battery devices described above.

Further, the atomizing device comprises an upper cover, a connecting tube and an atomizing head, wherein the upper cover is detachably capped at the top end of the liquid storing tub, wherein one end of the connecting tube is detachably connected on the upper cover and another end of the connecting tube is detachably connected to the open end, and the atomizing head is sleeved within the connecting tube.

Further, the connecting tube is disposed on one end connected to the open end with external threads, and an inner circumferential surface of the top end of the open end extends inward to form a connecting portion whose inner diameter adapted to an outer diameter of the connecting tube, and an inner circumferential surface of the connecting portion is disposed with inner threads adapted to the external threads of the connecting tube.

Further, the electronic cigarette further comprises a gas adjusting part which comprises a breather tube and a gas adjusting ring, wherein one end of the breather tube is inserted into the upper cap; the gas adjusting ring is rotatably sleeved on the outer circumference of another end of the breather pipe, and is disposed on a side wall with a gas-adjusting groove; and the upper cover is disposed with a gas inlet hole which is communicatively aligned or un-aligned with the gas-adjusting groove.

An electronic cigarette includes an atomizing assembly which includes a gas inlet tube, an unlocking member and a blocking member. The unlocking member is sleeved on an outer side of an upper end of the gas inlet tube. The blocking member is sleeved on an outer side of the gas inlet tube and between the gas inlet tube and the unlocking member. The gas inlet tube is disposed with a stop boss or a stop groove, and the unlocking member is disposed with a stop groove/stop boss. The blocking member is an elastic member, and is disposed with a blocking groove adapted to the stop boss. When the unlocking member is depressed so that the stop groove and the stop boss engage with each other, the electronic cigarette is in a mode that allows unlocking.

Further, the electronic cigarette further includes a battery assembly and a liquid storing assembly disposed in the housing. The liquid storing assembly is disposed with a liquid storing cavity, and a part of the atomizing assembly is disposed to be sleeved within the liquid storing cavity.

Further, an outer circumference of the gas inlet tube is disposed with connecting threads. The liquid storing assembly further includes a threaded ring disposed to adapt to the connecting threads, where the mating between the connecting threads and the threaded ring detachably connect the gas inlet tube to the liquid storing assembly.

Further, the threaded ring is disposed at the upper end of the liquid storing cavity.

Further, the atomizing device assembly includes an atomizing head, to which a lower end of the gas inlet tube is detachably connected. A periphery of the gas inlet tube extends outwardly to form a flange. A connecting portion is formed between the lower end of the gas inlet tube and the flange. The connecting threads are disposed along the outer circumference of the connecting portion.

Further, the atomizing assembly further includes an atomizing tube and a gas inlet and outlet separating tube. The gas inlet tube is sleeved on the outer side of the gas inlet and outlet separating tube. The atomizing tube is on one end in communication with the atomizing head, and on another end tightly fitted with the gas inlet and outlet separating tube.

Further, a first electrical contact is disposed on the bottom of the atomizing head. The liquid storing assembly is disposed with a second electrical contact which is electrically connected to the first electrical contact.

Further, the battery assembly includes a battery, a circuit board assembly holder mounted within the housing, the circuit board assembly mounted on the circuit board assembly holder, a battery pad mounted at an end of the housing, and a battery base cover in interference fit with the housing.

Further, the blocking member is made of rubber or silicone.

Further, the electronic cigarette further includes a detachable cigarette holder. The gas inlet and outlet separating tube is disposed at an end away from the atomizing tube a mounting hole into which an end of the cigarette holder is inserted.

The application also provides an electronic cigarette comprising an atomizing assembly and a battery assembly, wherein the atomizing assembly comprises a gas inlet tube holder, a gas outlet tube, an atomizing head and an adjusting ring, wherein the gas inlet tube holder comprises a gas inlet tube and a gas inlet adjusting end connected to an end of the gas inlet tube; a channel of the gas inlet tube is in communication with a channel of the gas inlet adjusting end to form a passage of the gas inlet tube holder; the gas outlet tube is sleeved in the passage of the gas inlet tube holder, separating the passage of the gas inlet tube holder into a gas outlet passage and a gas inlet passage; the atomizing head is connected to the gas inlet tube at an end thereof away from the gas inlet adjusting end; the adjusting ring is sleeved at the gas inlet adjusting end, the battery assembly comprises a battery housing disposed with a liquid storing cavity and a battery disposed in the battery housing, wherein the liquid storing cavity is used for containing cigarette liquid, and is disposed at a bottom thereof with a battery polarity contact member which is electrically connected to the battery; the atomizing assembly is detachably mounted in the liquid storing cavity through the gas inlet tube holder, and the atomizing head is electrically connected to the battery polarity contact member.

Further, the gas inlet adjusting end comprises a gas inlet adjusting section whose tube wall is disposed with a gas inlet hole, wherein the adjusting ring is provided on an annular wall thereof with a adjusting hole in communication with the gas inlet hole, wherein the amount of gas entering into the gas inlet passage can be adjusted by rotating or moving up and/or down the adjusting ring.

Further, the gas inlet tube holder comprises a connecting section disposed between the gas inlet tube and the gas inlet adjusting end, wherein the connecting section is formed on an outer circumferential wall thereof with external threads; and the liquid storing cavity is disposed at a top end opening thereof with internal threads adapted to the external threads.

Further, the battery housing comprises a main housing and an upper cover, wherein the main housing has a containing cavity in which the battery is assembled, and the containing cavity being capped by the upper cover.

Further, the main housing is disposed inside with a liquid storing tube, and comprises a base plate, side walls oppositely disposed on the base plate, and a connecting wall connecting a side of two side walls, wherein a top end of the connecting wall is lower than that of the side wall; an upper portion of the connecting wall is disposed with a top plate which is connected to the two side walls, and a liquid storing tube mounting space for mounting the liquid storing tube is formed at the top end of the connecting wall.

Further, the battery assembly further comprises a circuit board assembly, retaining bars are oppositely disposed on an inside of the two side walls, wherein the circuit board assembly comprises a circuit board and a battery dock, wherein the circuit board is on one face abutted against the retaining bars, and on another face fixedly connected to the battery dock, wherein the battery dock is disposed on one face opposite to the circuit board with a battery mounting space.

Further, the gas inlet tube holder is disposed on a top end thereof with a stop ring whose outer circumference is disposed with a stop boss protruding therefrom, wherein the adjusting ring is disposed on an inner circumferential wall thereof with a stop groove adapted to the stop boss; and the atomizing assembly comprises a rubber pad which is elastically abutted against and held between the stop boss and the stop groove.

Further, the atomizing head comprises an atomizing head sleeve, a positive pole contacting member, a positive pole insulating pad, a liquid absorbing member and a heating member, wherein the positive pole contacting member is sleeved at one end of the atomizing head sleeve, and is insulatively isolated from the atomizing head sleeve by the positive pole insulating pad; the liquid absorbing member is disposed within the atomizing head sleeve; the heating member is mounted within the atomizing head sleeve; and the heating member is connected on one end to the atomizing head sleeve, and on another end to the positive pole contact member.

Further, the heating member and the liquid absorbing member are integrally formed.

Further, the liquid absorbing member is a ceramic heating rod which is made of a porous ceramic material.

In the electronic cigarette of the present application, the liquid storing assembly is directly disposed in the battery device, so that during an installation process, the user only needs to make one connection to complete the connection between the atomizing device, the battery device and the liquid storing assembly. Moreover, the user may directly insert the end of the atomizing device having the atomizing head into the liquid storing assembly to form the electrical connection with the power supply assembly, which make the installation simple, and the electrical connection between the atomizing head and the power supply assembly is more reliable.

DETAILED DESCRIPTION

To facilitate the understanding, the present application will be described more fully hereinafter with reference to the accompanying drawings. The preferred embodiments of the application are given in the accompanying drawings. However, the present application may be embodied in many different forms and is not limited to the embodiments described herein. Rather, these embodiments are provided so that this disclosure will be understood more thoroughly and completely.

It should be noted that when an element is referred to as being "fixed" to another element, it may be disposed directly, or indirectly via intermediate element(s), on another element. When an element is deemed to be "connected" to another element, it may be connected directly, or indirectly via intermediate element(s), to another element.

Unless otherwise defined, all technical and scientific terms used herein carry the same meaning as those commonly understood by those skilled in the art pertaining to the present disclosure. The terms as used in the description of the present disclosure are merely for the purpose of describing specific embodiments, rather than for limiting the present disclosure. The term "and/or" used herein includes any and all combinations of one or more related listed items.

Embodiment 1

Figure 1:
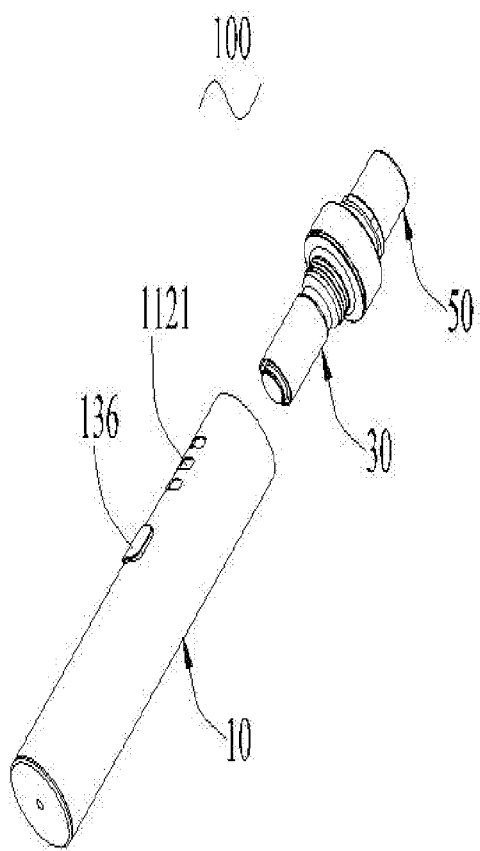
FIG. 1 is a schematic dissembled view of an electronic cigarette according to a first embodiment of the present application.

Referring to FIG. 1, in a preferred embodiment of the present application, an electronic cigarette 100 includes a battery device 10, an atomizing device 30, and a cigarette holder 50. The atomizing device 30 is connected between the battery device 10 and the cigarette holder 50 and is electrically connected to the battery device 10 for generating smoke to be inhaled by the user. In this specific embodiment, the atomizing device 30 is detachably disposed at one end of the battery device 10 via a threaded connection. The cigarette holder 50 is detachably disposed at an end of the atomizing device 30 opposite to the battery device 10 by means of a pluggable connection. It can be understood that in some of the other embodiments, the connection between the atomizing device 30 and the battery device 10 and the connection between the atomizing device 30 and the cigarette holder 50 can be determined according to the need as long as the detachable connection is implemented, which will not be limited herein.

Figure 2:
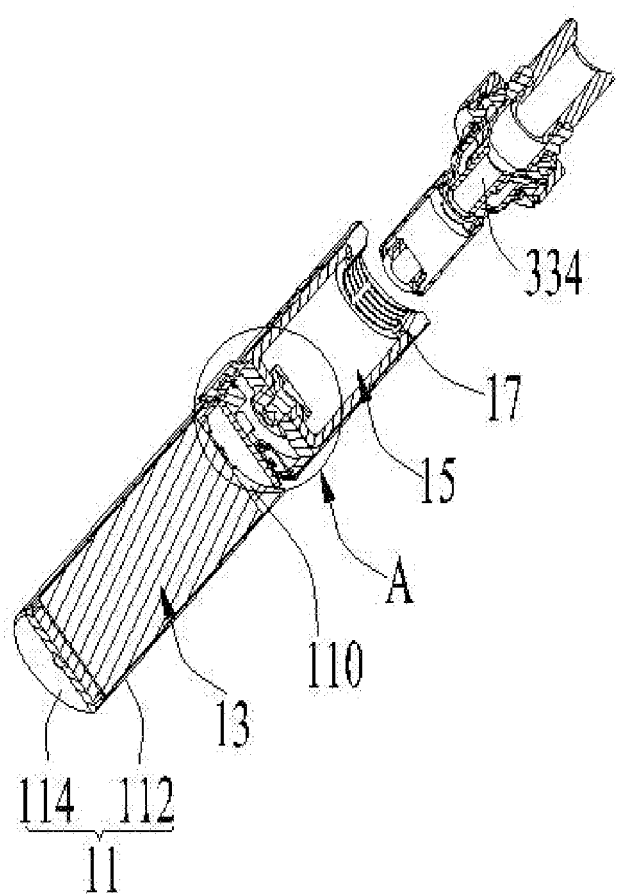
FIG. 2 is a sectional view of the electronic cigarette shown in FIG. 1.
Figure 3:
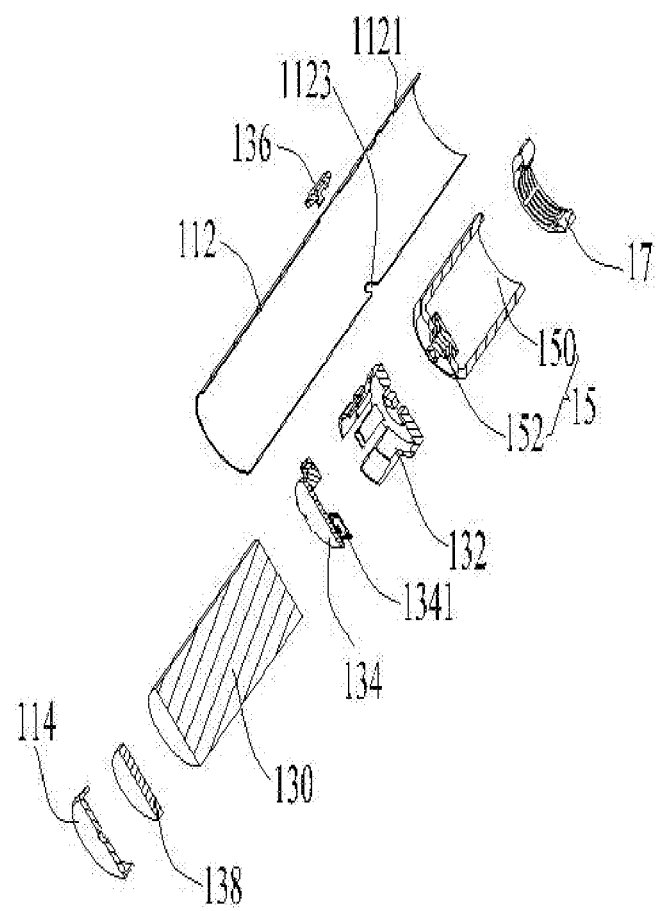
FIG. 3 is a schematic dissembled view of a battery device in the electronic cigarette shown in FIG. 2.

Referring to FIGS. 2 and 3, the battery device 10 includes a housing 11 having an accommodating inner cavity 110, as well as a power supply assembly 13, a liquid storing assembly 15 and a connecting member 17, which are disposed in the accommodating inner cavity 110 from bottom to top in that order.

The housing 11 includes a shell 112 and a bottom cover 114. The shell 112 is formed into a hollow tubular shape with both ends in perforation with each other, and a window 1121 is provided for observing the amount of cigarette liquid left in the liquid storing assembly 15. The bottom cover 114 is detachably or fixedly disposed at one end of the shell 112, defining, together with the shell 112, an accommodating inner cavity 110.

The power supply assembly 13 includes a battery 130, a circuit board holder 132, a circuit board 134, and a button assembly 136. The battery 130 is supported on the bottom cover 114. The circuit board 134 is disposed on the circuit board holder 132 and is electrically connected to the battery 130. The button assembly 136 is exposed outside the shell 112 and is electrically connected to the circuit board 134, allowing the user to control the operating mode of the electronic cigarette 100.

Further, the circuit board 134 is disposed with a USB socket 1341, and a USB socket connecting hole 1123 adapted to the USB socket 1341 is provided on the shell 112 for the user to plug in the USB (not shown).

Further, the power supply assembly 13 further includes a battery pad 138 disposed between the battery 130 and the bottom cover 114 for preventing the battery 130 from becoming loose.

The liquid storing assembly 15 includes a liquid storing tube 150 for storing cigarette liquid, and an electrode contacting member 152. The electrode contacting member 152 is disposed at the bottom of the liquid storing tube 150, with one end extending through the bottom thereof into the inner cavity of the liquid storing tube 150, and with another end electrically connected to the circuit board 134 in the power supply assembly 13.

Figure 4:
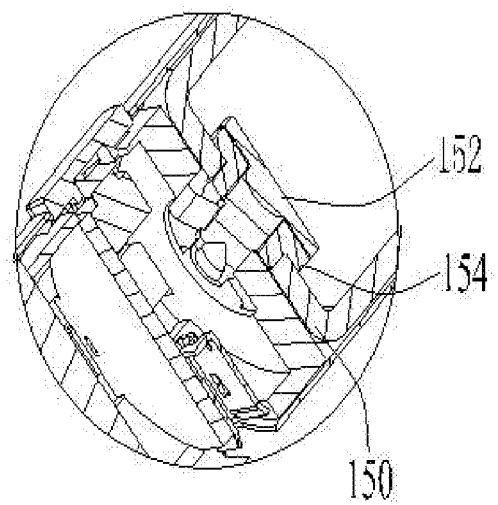
FIG. 4 is a partially enlarged view of part A of the electronic cigarette shown in FIG. 2.

Further, referring to FIG. 4, the liquid storing assembly 15 further includes a sealing member 154. The sealing member 154 is disposed between the bottom of the liquid storing tube 150 and the electrode contacting member 152 for preventing the cigarette liquid from leaking out of the gap between the liquid storing tube 150 and the electrode contacting member 152.

Continuing with FIG. 3, the connecting member 17 is disposed at an end of the liquid storing tube 150 away from the power supply assembly 13, i.e, at the open end of the liquid storing tube 150, allowing the atomizing device 30 to be inserted into the liquid storing tube 150 from the open end and be detachably connected to the battery device 10 via the connecting member 17. In the present specific embodiment, the connecting member 17 is a threaded ring detachably connected to the atomizing device 30 via a threaded connecting means. It can be understood that in some other embodiments, the connection between the connecting member 17 and the atomizing device 30 may also be made via other structures, such as a snapping means between a flange and a card slot, which will not be limited herein.

Figure 5:
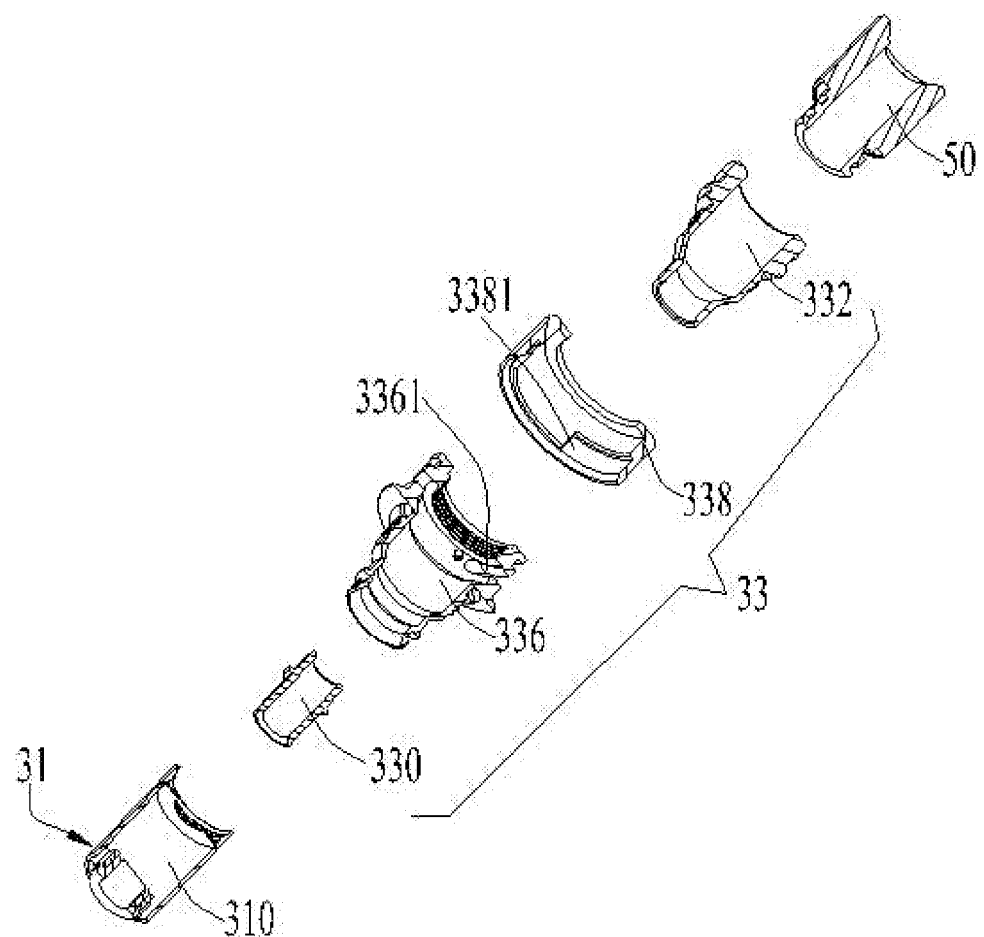
FIG. 5 is a schematic dissembled view of an atomizing device having a cigarette holder in the electronic cigarette shown in FIG. 2.
Figure 6:
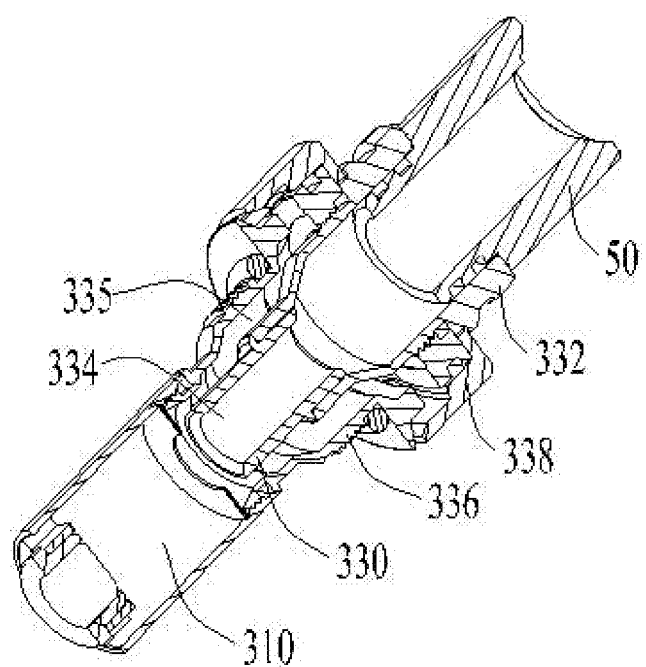
FIG. 6 is a schematic assembled view of an atomizing device having a cigarette holder in the electronic cigarette shown in FIG. 5.

Referring to FIGS. 5 and 6, the atomizing device 30 is accommodated in the liquid storing tube 150. The atomizing device 30 includes an atomizing head 31 having an atomizing cavity 310 and a gas adjusting assembly 33. The atomizing head 31 is accommodated in the liquid storing tube 150, with its bottom in contact with the electrode contacting member 152, and is electrically connected to the circuit board 134 in the power supply assembly 13 via the electrode contacting member 152. The gas adjusting assembly 33 is in communication between the atomizing head 31 and the cigarette holder 50 for adjusting the volume of the gas flow entering the atomizing cavity 310.

Specifically, the gas adjusting assembly 33 includes a breather tube 330 and a gas inlet and outlet separating tube 332. The breather tube 330 is disposed on one end at an end of the atomizing head 31 opposite to the electrode contacting member 152, and on another end in interference fit with the gas inlet and outlet separating tube 332. The cigarette holder 50 is disposed at an end of the gas inlet and outlet separating tube 332 away from the breather tube 330. The breather tube 330 and the gas inlet and outlet separating tube 332 together form a smoke outlet passage 334 in communication between the atomizing cavity 310 and the cigarette holder 50, so that the smoke generated from the atomization in the atomizing cavity 310 may be inhaled into the user's mouth through the smoke outlet passage 334.

Further, the gas adjusting assembly 33 further includes a gas inlet ring 336 and a gas inlet adjusting ring 338. The gas inlet ring 336 is sleeved on the outer circumference of where the breather tube 330 joins the gas inlet and outlet separating tube 332. The lower end of the gas inlet ring 336 is in communication with the atomizing cavity 310. The gas inlet adjusting ring 338 is sleeved on the outer circumference of the upper end of the gas inlet ring 336. A gap between the gas inlet ring 336 and the gas inlet and outlet separating tube 332 and a gap between the gas inlet ring 336 and the breather tube 330 form a gas inlet passage 335. The gas inlet ring 336 is provided with at least one gas inlet hole 3361 in communication with the gas inlet passage 335. The inner wall of the gas inlet adjusting ring 338 is disposed with a gas adjusting groove 3381. Turning the gas inlet adjusting ring 338 can communicatively align or un-align the gas adjusting groove 3381 with the gas inlet hole 3361, so that the user can adjust the volume of gas inlet as needed. In addition, since the gas adjusting groove 3381 is provided on the inner wall of the gas inlet adjusting ring 338, the possibility of contamination from external source can be reduced, and the aesthetics can also be improved.

In practical use, when the gas adjusting groove 3381 is in communication with the gas inlet hole 3361, external air will enter the atomizing cavity 310 via the gas adjusting groove 3381, gas inlet hole 3361 and gas inlet passage 335, and be sucked by the user's inhales via the smoke outlet passage 334 and the cigarette holder 50 into the user's mouth, bringing along atomized cigarette liquid. When the gas adjusting groove 3381 is un-aligned with the gas inlet hole 3361, the inner wall of the gas inlet adjusting ring 338 will cover the outside of the gas inlet hole 3361 to block the communication between the external environment and the gas inlet passage 335. By adjusting the communicating area between the gas adjusting groove 3381 and the gas inlet hole 3361, it is possible to tune the volume of external air entering the atomizing cavity 310.

In the electronic cigarette 100 of the present application, the liquid storing assembly 15 is directly disposed in the battery device 10, so that during an installation process, the user only needs to make one connection to complete the connection between the atomizing device 30, the battery device 10 and the liquid storing assembly 15. Moreover, the user may directly insert the end of the atomizing device 30 having the atomizing head 31 into the liquid storing assembly 15 to form an electrical connection with the power supply assembly 13, which make the installation simple, and the electrical connection between the atomizing head 31 and the power supply assembly 13 is more reliable.

Embodiment 2

Figure 7:
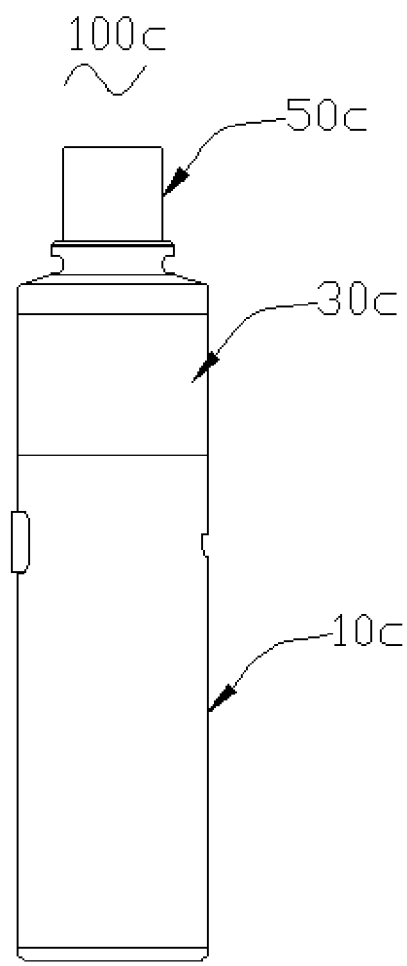
FIG. 7 is a schematic structural view of an electronic cigarette according to a second embodiment of the present application.

Referring to FIG. 7, in a preferred embodiment of the present application, an electronic cigarette 100c includes a battery device 10c, an atomizing device 30c, and a cigarette holder 50c. The atomizing device 30c is connected between the battery device 10c and the cigarette holder 50c and is electrically connected to the battery device 10c for generating smoke to be inhaled by the user when electrically driven by the battery device 10c.

Figure 8:
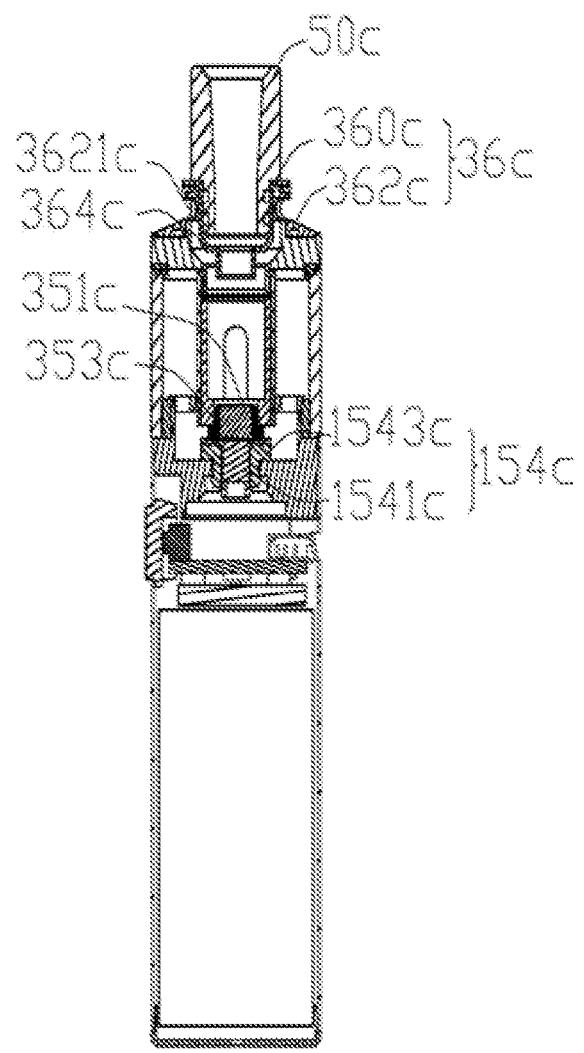
FIG. 8 is a sectional view along an axis of the electronic cigarette shown in FIG. 7.
Figure 9:
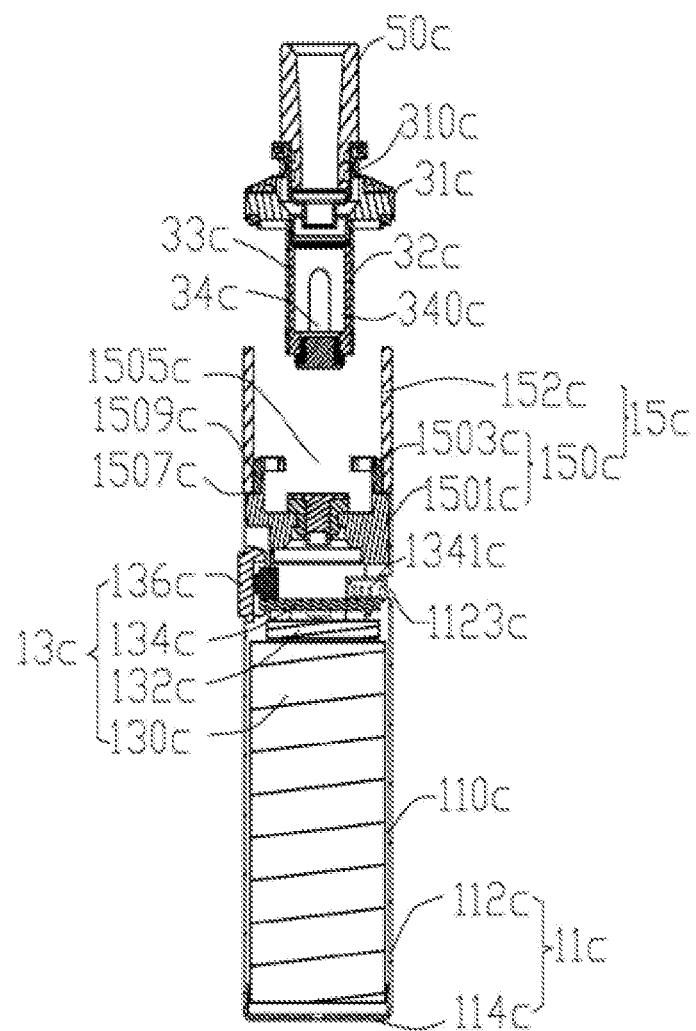
FIG. 9 is a partial schematic dissembled view of the electronic cigarette shown in FIG. 8.
Figure 10:
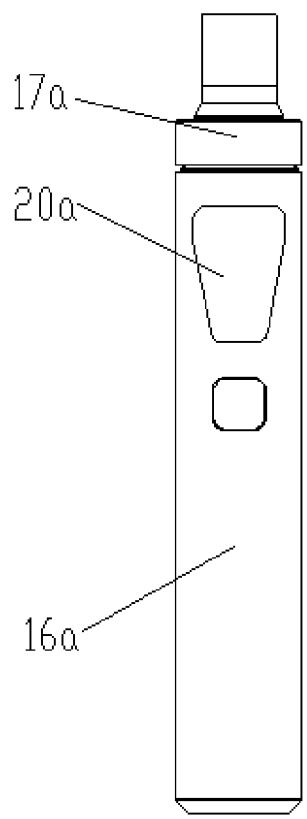
FIG. 10 is a primary view of an electronic cigarette according to a third embodiment of the present application.
Figure 11:
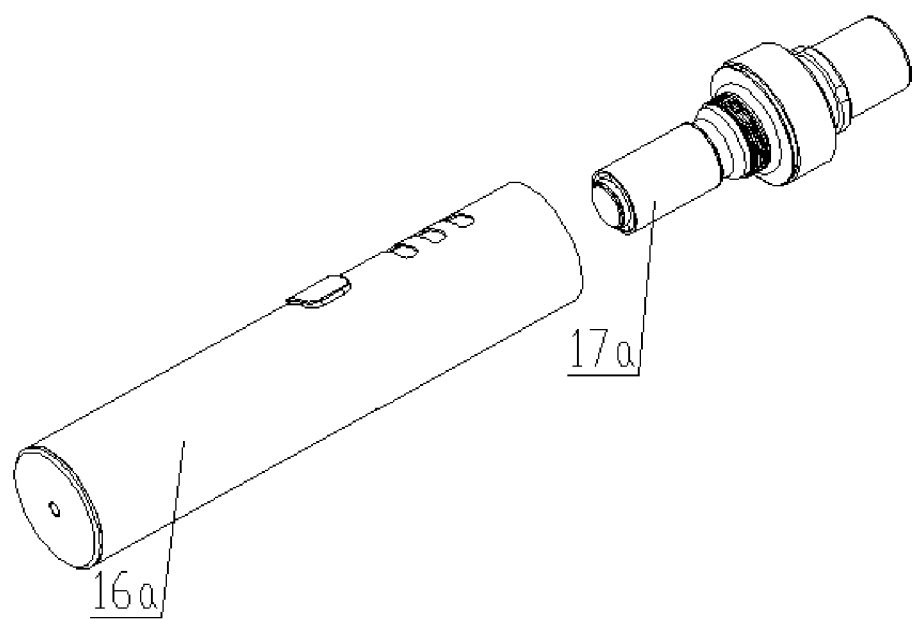
FIG. 11 is a schematic dissembled view of an atomizing assembly and a main body portion in the electronic cigarette shown in FIG. 10.
Figure 12:
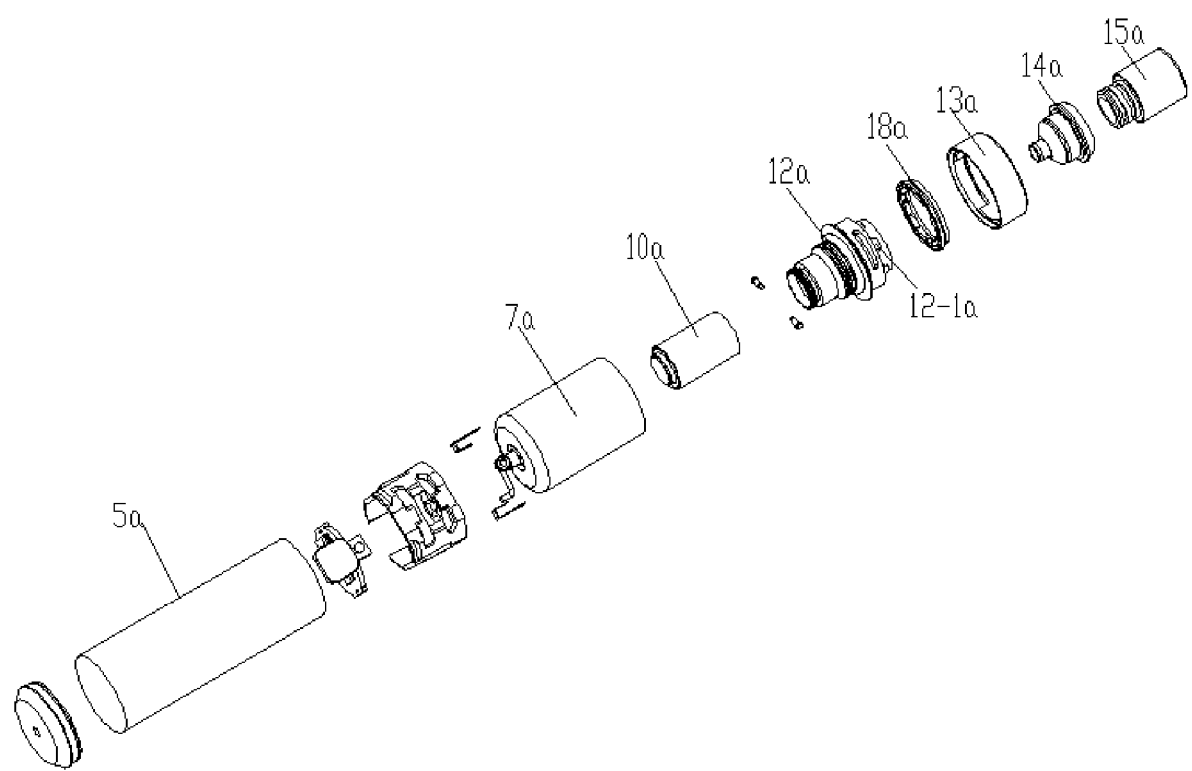
FIG. 12 is an exploded view of the electronic cigarette shown in FIG. 10.
Figure 13:
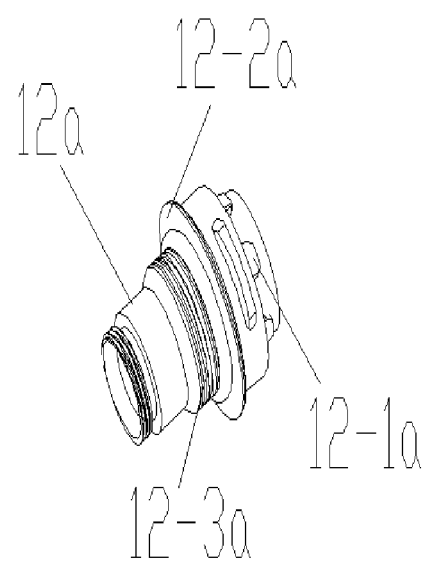
FIG. 13 is a schematic view of a gas inlet tube in the electronic cigarette shown in FIG. 12.
Figure 14:
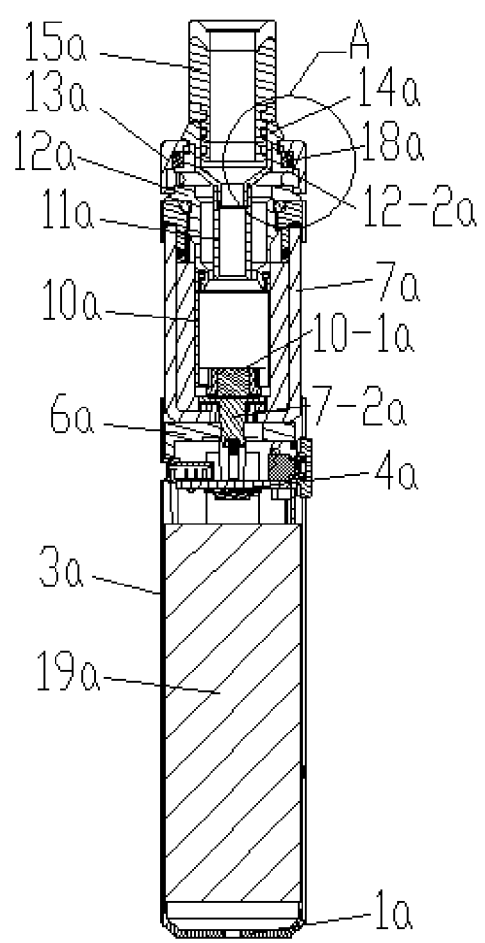
FIG. 14 is a sectional view of a locked electronic cigarette shown in FIG. 10.
Figure 15:
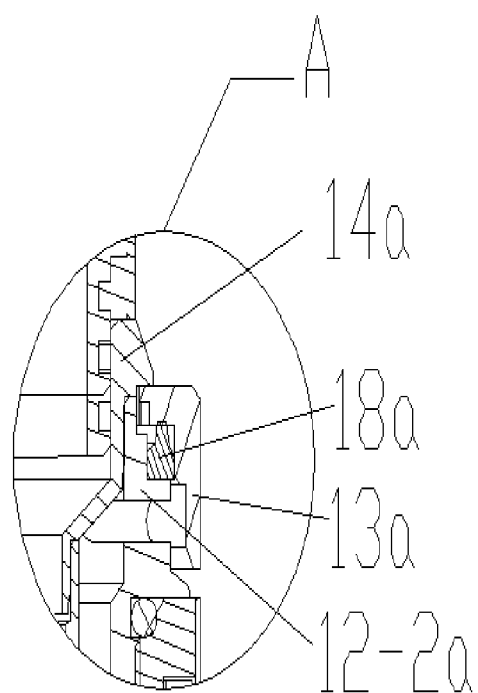
FIG. 15 is an enlarged view of part A of the sectional view of the electronic cigarette shown in FIG. 14.
Figure 16:
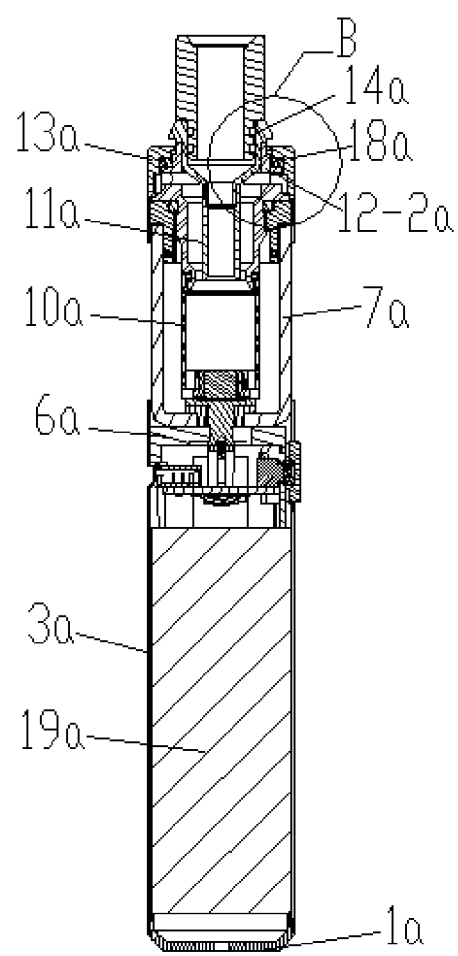
FIG. 16 is a sectional view of a depressed and unlocked electronic cigarette shown in FIG. 10.
Figure 17:
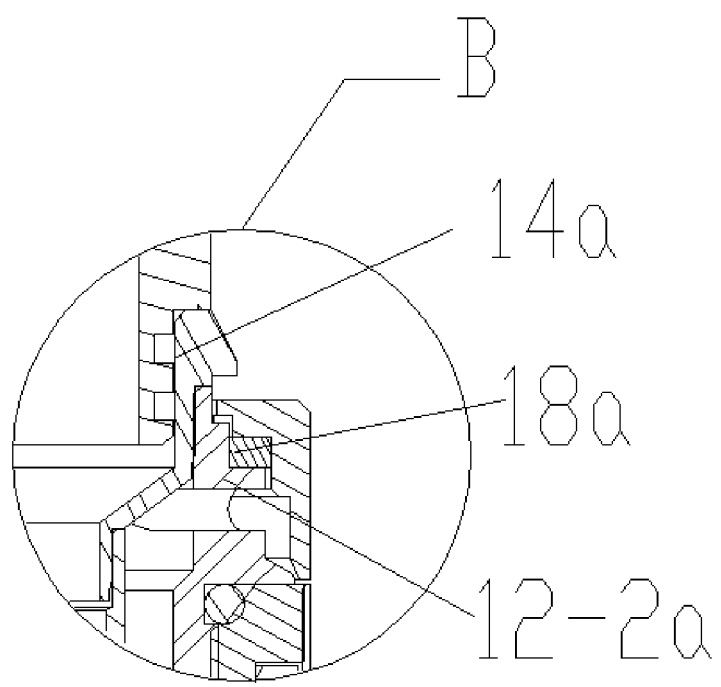
FIG. 17 is an enlarged view of part B of the sectional view of the electronic cigarette shown in FIG. 16.
Figure 18:
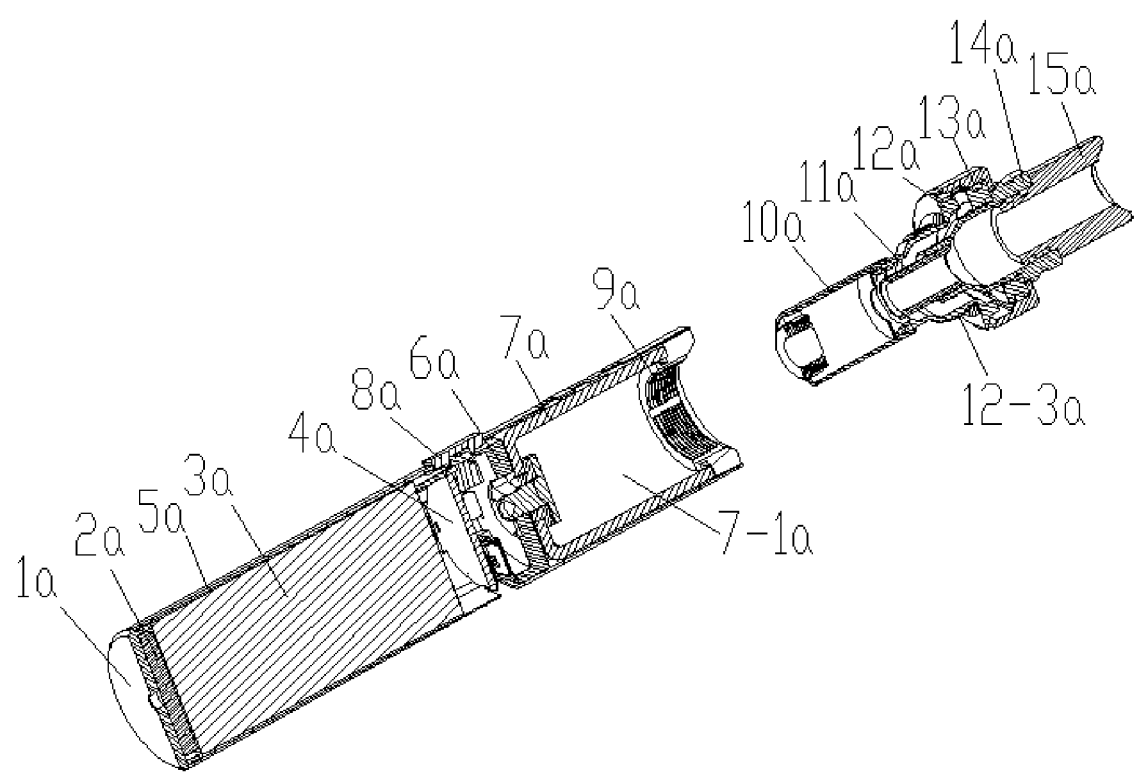
FIG. 18 is a sectional view of the exploded view of the electronic cigarette shown in FIG. 11.
Figure 19:
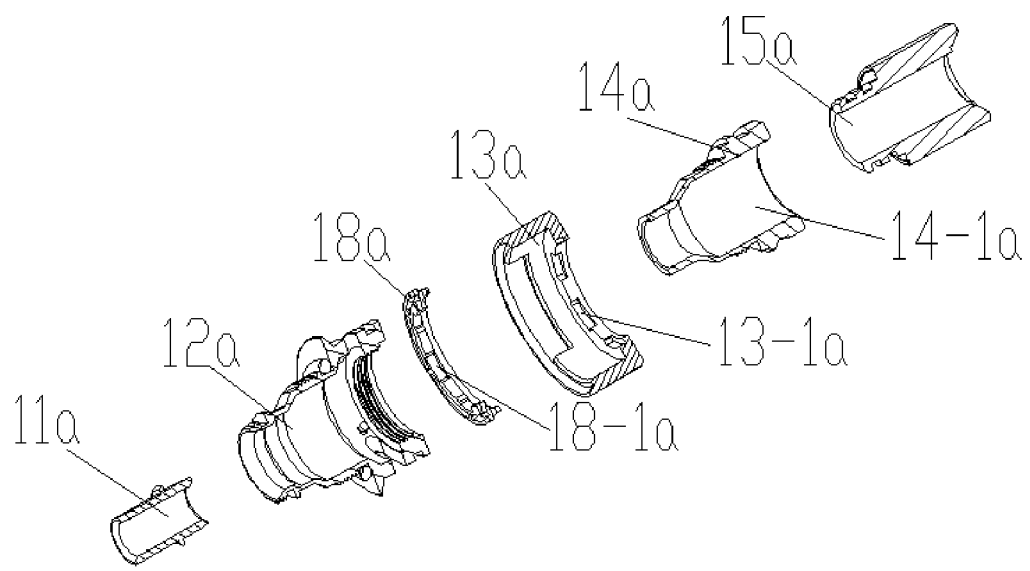
FIG. 19 is an exploded sectional view of the atomizing assembly of the electronic cigarette shown in FIG. 11.
Figure 20:
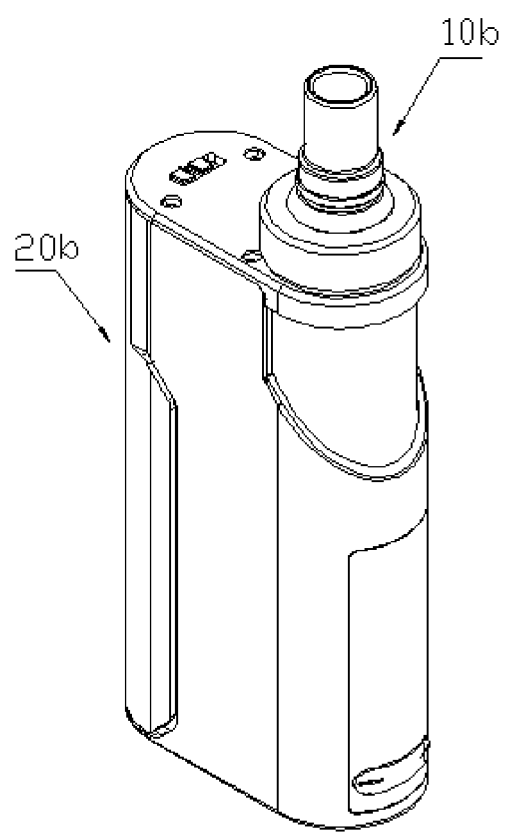
FIG. 20 is a perspective view of a convenient liquid-refillable electronic cigarette according to a fourth embodiment of the present application.
Figure 21:
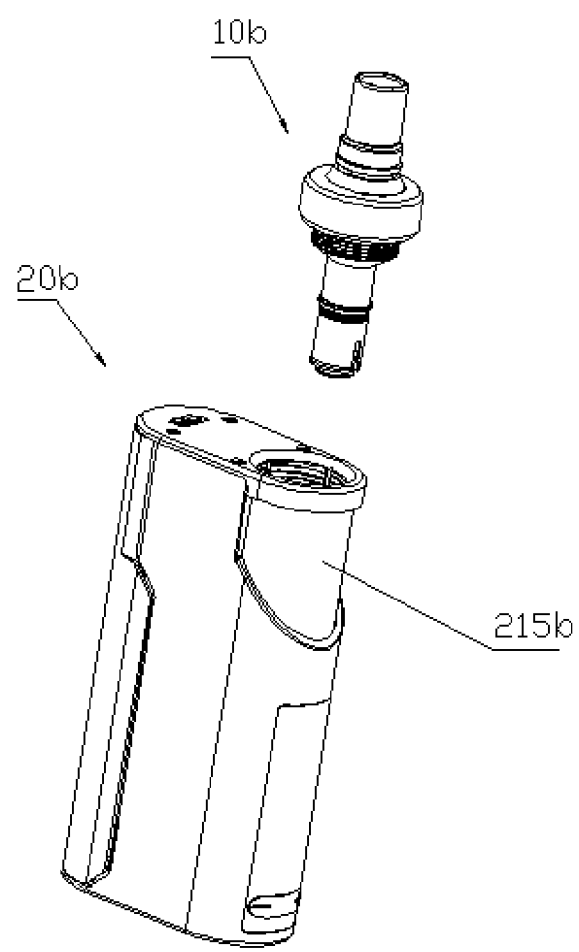
FIG. 21 is a dissembled view of the electronic cigarette shown in FIG. 20.
Figure 22:
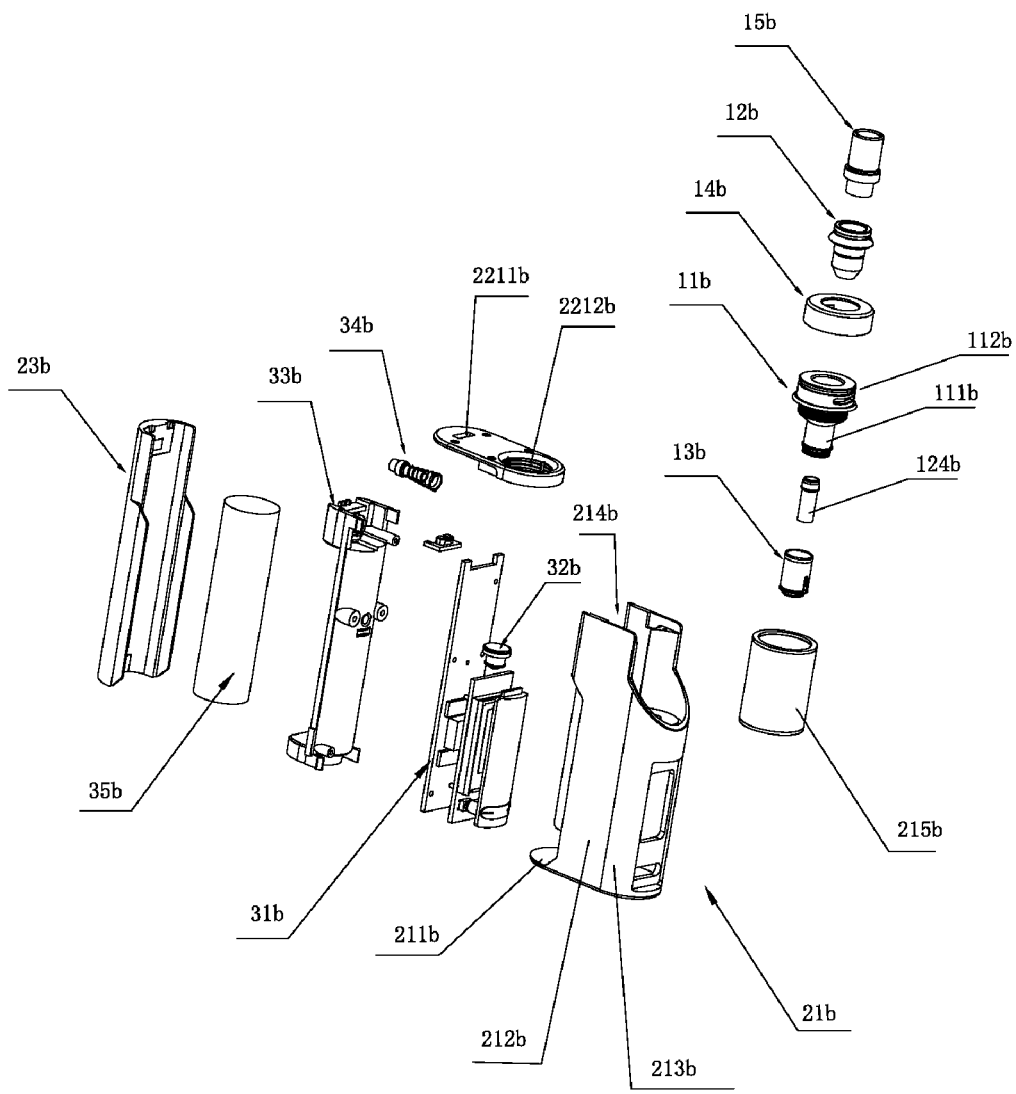
FIG. 22 is an exploded view from a first perspective of the electronic cigarette shown in FIG. 20.
Figure 23:
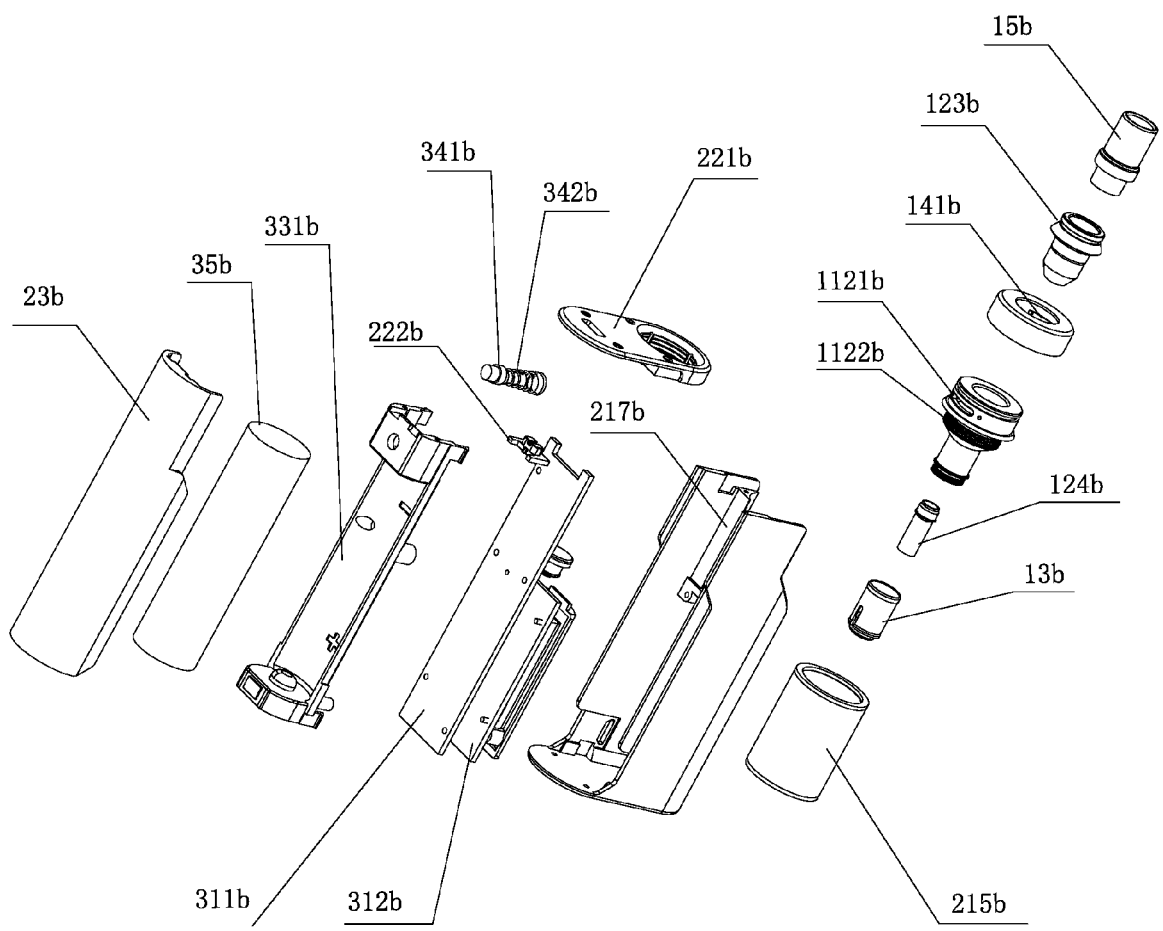
FIG. 23 is an exploded view from a second perspective of the electronic cigarette shown in FIG. 20.
Figure 24:
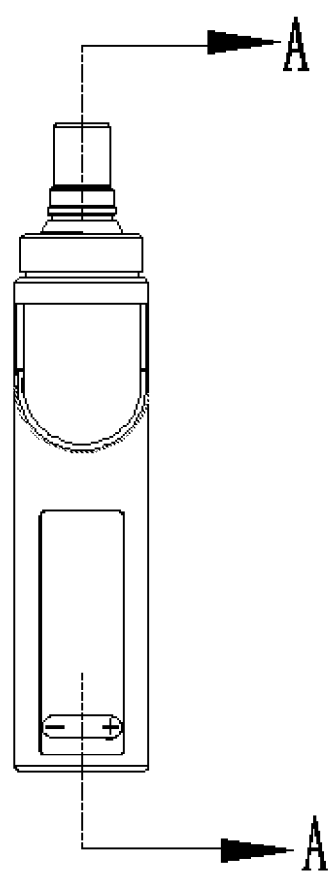
FIG. 24 is a primary view of the electronic cigarette shown in FIG. 20.
Figure 25:
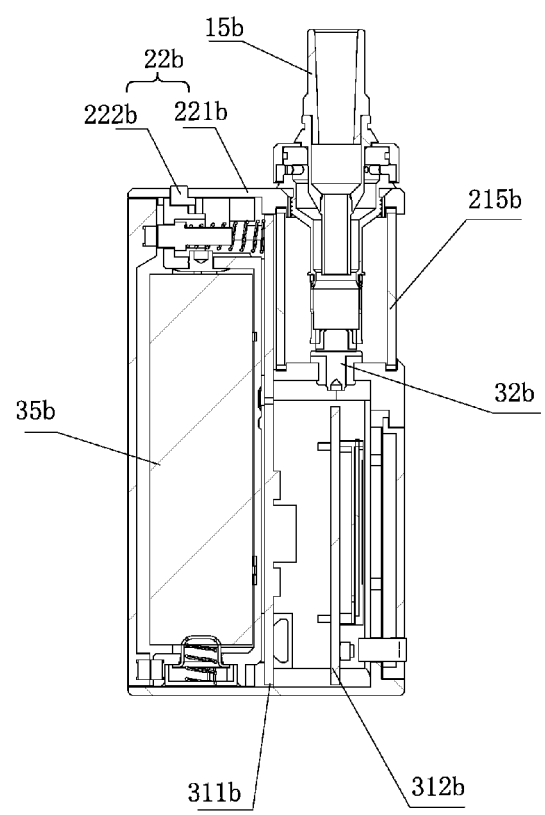
FIG. 25 is a sectional view along the direction A-A of the electronic cigarette shown in FIG. 24.
Figure 26:
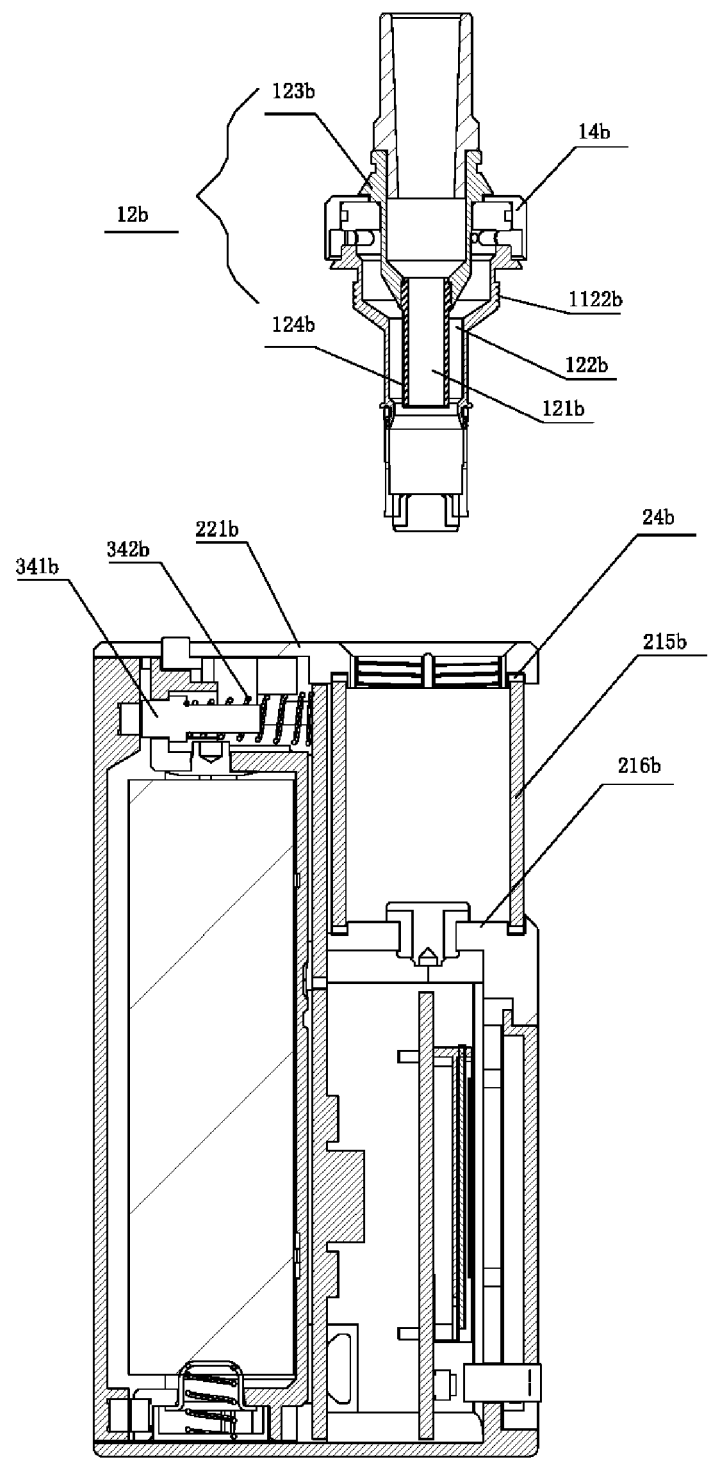
FIG. 26 is a sectional view along the direction A-A of the electronic cigarette shown in FIG. 24 after the atomizing assembly and the battery assembly are detached.

Referring to FIGS. 8 and 9, the battery device 10c includes a housing 11c having an accommodating inner cavity 110c, a power supply assembly 13c and a liquid storing assembly 15c. The housing 11c is a hollow cylinder that is open at one end, and includes a shell 112c and a bottom cover 114c. The shell 112c is formed into a hollow tubular shape with both ends in perforation with each other. The bottom cover 114c is detachably or fixedly disposed at one end of the shell 112c, defining, together with the shell 112c, an accommodating inner cavity 110c.

The power supply assembly 13c includes a battery 130c, a circuit board holder 132c, a circuit board 134c, and a button 136c. The battery 130c, the circuit board holder 132c and the circuit board 134c are all accommodated in the accommodating inner cavity 110c. The battery 130c is supported on the bottom cover 114c. The circuit board 134c is disposed on the circuit board holder 132c and is electrically connected to the battery 130c. One end of the key 136c is exposed outside the housing 11c, and another end of the key 136c is located in the housing 11c to electrically connect to the circuit board 134c for controlling the electronic cigarette 100c according to user operations.

Further, the circuit board 134c is disposed with a USB socket 1341c, and a USB socket connecting hole 1123c adapted to the USB socket 1341c is provided on the shell 112c for the user to plug in the USB (not shown).

The liquid storing assembly 15c includes a liquid storing base 150c, a liquid storing tube 152c, and a first electrode contacting assembly 154c. The liquid storing base 150c includes a fixed end 1501c and an open end 1503c opposite to the fixed end 1501c. The fixed end 1501c is disposed to be fixedly connected within the accommodating inner cavity 110c, and the open end 1503c extends out of the accommodating inner cavity 110c.

Specifically, the open end 1503c is formed by the top of the fixed end 1501c extending to a direction away from the accommodating inner cavity 110c, and together with the fixing end 1501c, enclosing to form an inner cavity 1505c for accommodating the first electrode contacting assembly 154c.

The liquid storing tube 152c is formed into a hollow tubular shape with both ends in perforation with each other. The bottom end of the liquid storing tube 152c is pluggably sleeved on the outer side of the open end 1503c, and abuts against the upper end surface of the fixed end 1501c. The first electrode contacting assembly 154c is disposed on the fixed end 1501c of the liquid storing base 150c, with one end extending through the fixed end 1501c into the inner cavity 1505c to electrically connect to the atomizing device 30c, another end extending through the fixed end 1501c into the accommodating inner cavity 110c to electrically connect to the circuit board 134c within the power supply assembly 13c.

Thus, after the electronic cigarette 100c is used for an extended period, the user can simply unplug the liquid storing tube 152c from the liquid storing base 150c for washing without disassembling the liquid storing base 150c which is disposed with the electrical connecting member (i.e., the first electrode contacting assembly 154c in the present specific embodiment), thereby avoiding the inconvenience in washing the liquid storing tube 152c due to the liquid storing base 150c disposed with the electrical connecting member.

In the present specific embodiment, the liquid storing tube 152c is a glass tube to facilitate the user to observe the remaining amount of the cigarette oil stored in the liquid storing tube 152c. The first electrode contacting assembly 154c includes a first electrode 1541c and a first insulating ring 1543c. The first electrode 1541c is disposed to be passed through the bottom of the fixed end 1501c. The first insulating ring 1543c is electrically isolated between the first electrode 1541c and the fixed end 1501c.

Further, the liquid storing assembly 15c further includes a liquid storing seal 1509c, and a mounting step 1507c is formed between the outer surface of the open end 1503c facing away from the inner cavity 1505c and the fixed end 1501c. The liquid storing seal 1509c is supported on the mounting step 1507c and is disposed to be sealed between the bottom end of the liquid storing tube 152c and the open end 1503c, preventing cigarette oil from leaking out of the gap between the liquid storing tube 152c and the liquid storing base 150c.

One end of the atomizing device 30c can be inserted from the top end of the liquid storing tube 152c into the liquid storing tube 152c to be detachably connected to the open end 1503c. The atomizing device 30c includes an upper cover 31c, a connecting tube 32c, an atomizing head 34c, and a gas adjusting member 36c.

Specifically, the upper cover 31c is detachably disposed to cap the top end of the liquid storing tub 152c. The connecting tube 32c is detachably connected on one end to the upper cover 31c, and on another end to the open end 1503c of the liquid storing base 150c. In the present specific embodiment, the end of the connecting tube 32c connected to the upper cover 31c is disposed with internal threads, and the end of the connecting tube 32c connected to the open end 1503c of the liquid storing base 150c is disposed with external threads. Correspondingly, the upper cover 31c is disposed with external threads adapted to the internal threads of the connecting tube 32c, and the inner surface of the open end 1503c is disposed with internal threads adapted to the external threads of the connecting tube 32c. It can be understood that in some other embodiments, the connection between the connecting tube 32c and the open end 1503c of the liquid storing base 150c may also be made via other detachable structures, such as a snapping means between a flange and a card slot, which will not be limited herein.

Further, in order to be adapted to the connecting tube 32c, an inner circumferential surface at the top end of the open end 1503c extends inwards to form a connecting portion whose inner diameter is adapted to the outer diameter of the connecting tube 32c, and the inner circumferential surface of the connecting portion is disposed with internal threads adapted to the external threads of the connecting tube 32c.

The atomizing head 34c is sleeved in the connecting tube 32c, and includes an atomizing head sleeve 340c, a second electrode contacting assembly, a heating member (not shown) and a liquid guiding member (not shown). The inner cavity of the atomizing head sleeve 340c is an atomizing cavity in communication with the cigarette holder 50c. The heating element and the liquid guiding member are both disposed in the atomizing cavity. The atomizing head sleeve 340c is provided with a liquid inlet groove 3401c in communication with the atomizing cavity and the inner cavity of the liquid storing tube 152c. The liquid guiding member transfers the cigarette liquid to the heating member through the liquid inlet groove 3401c, where the heating member is electrically driven to heat the cigarette oil and generate smoke to flow out into the cigarette holder 50c. The second electrode contacting assembly is disposed to be passed through the bottom of the atomizing head sleeve 340c and is disposed in contact with the first electrode contacting assembly 154c, so as to be in direct electrical connection with the circuit board 134c in the power supply assembly 13c through the first electrode contacting assembly 154c, providing electrical drive to the atomizing head 34c. In the present specific embodiment, the second electrode contacting assembly includes a second electrode and a second insulating ring, where the second electrode is disposed to be passed through the bottom of the atomizing head sleeve 340c, and the second insulating ring is electrically isolated between the second insulating ring and the atomizing head sleeve 340c.

The gas adjusting assembly 36 is in communication between the external environment and the atomizing cavity for adjusting the volume of the flow entering the atomizing cavity.

Specifically, the gas adjusting assembly 36c includes a breather tube 360c and a gas adjusting ring 362c. One end of the breather tube 360c is disposed to be inserted into the upper cover 31c to communicate with the atomizing cavity. The cigarette holder 50c is pluggably disposed in the breather tube 360c.

The gas adjusting ring 362c is rotatably sleeved on the outer circumference of another end of the breather tube 360c, and is supported on the upper cover 31c, and the side wall of the gas adjusting ring 362c is disposed with a gas adjusting groove 3621c. Correspondingly, the upper cover 31c is disposed with a gas inlet hole 310c that can be communicatively aligned or un-aligned with the gas adjusting groove 3621c, so that the user can adjust the communicating area between the gas adjusting groove 3621c and the gas inlet hole 310c as needed to adjust the volume of the external air entering the atomizing cavity. At the same time, since the gas adjusting groove 3621c is disposed on the side wall of the adjusting ring 362c whose upper end has a stop edge 3623c extending outwards, the gas adjusting groove 3621c is less likely to be contaminated by the external environment, and the aesthetics can also be improved.

In addition, a gap between the inner cavity of the upper cover 31c and the breather tube 360c forms a gas inlet passage 364c in communication with the atomizing cavity, and an inner cavity of the breather tube 360c forms a gas outlet passage in communication with the cigarette holder 50c and the atomizing cavity.

In practical use, when the gas adjusting groove 3621c is in communication with the gas inlet hole 310c, external air will enter the atomizing cavity via the gas adjusting groove 3621c, gas inlet hole 310c and gas inlet passage 364c, and be sucked by the user's inhales via the breather tube 360c and the cigarette holder 50c into the user's mouth, bringing along atomized cigarette oil. When the gas adjusting groove 3621c is un-aligned with the gas inlet hole 310c, the inner wall of the gas adjusting ring 362c will cover the outside of the gas inlet hole 310c to block the communication between the external environment and the gas inlet passage 364c.

In the electronic cigarette 100c of the embodiment of the present application, a liquid storing base 150c disposed with an electrical connecting member is fixedly connected on the battery device 10c, and is located at the lower end of the liquid storing tube 152c. The liquid storing tube 152c for storing the cigarette oil is pluggably sleeved on the outer side of the open end 1503c so that the user can directly unplug the liquid storing tube 152c from the liquid storing base 150c for washing, dodging the liquid storing base 150c disposed with the electrical connecting member. At the same time, when the battery device 10c is mated with the atomizing device 30c, the user can complete the connection between the atomizing device 30c and the open end 1503c in the liquid storing assembly 15c with only one connection, making the installation simple, and the electrical connection between the atomizing device 30c and the battery device 10c more reliable.

Embodiment 3

As shown in FIGS. 10 to 19, an electronic cigarette of the present application includes an atomizing assembly 17a and a main body portion 16a connected to the atomizing assembly 17a. In the present embodiment, the atomizing assembly 17a and the main body portion 16a are both detachably connected together. According to a preferred embodiment of the present embodiment, the main body portion 16a includes an integrally disposed battery device 3a and a liquid storing assembly 7a. According to one of the embodiments of the present application, the battery device 3a and the liquid storing assembly 7a are both disposed in the housing 5a. Specifically, one end of the housing 5a is disposed with a hollow cavity, in which a liquid storing assembly 7a is disposed, where the liquid storing assembly 7a is disposed with a liquid storing cavity 7-1a. Specifically, the liquid storing assembly 7a includes a transparent or semi-transparent structure, e.g., preferably made of transparent resin or glass, that is a cup-shaped body. The bottom end of the liquid storing cavity 7-1a is enclosed by the second electrical contacting member 7-2a to prevent cigarette liquid from leaking out of the bottom of the liquid storing cavity 7-1a. A part of the atomizing assembly 17a is sleeved in the liquid storing cavity 7-1a, so that the upper end of the liquid storing cavity 7-1a is enclosed by the atomizing assembly 17a. The other part of the atomizing assembly 17a is exposed outside, forming a part of the electronic cigarette's appearance. The housing 5a is further disposed with a window 20a, through which the user may observe the cigarette liquid situation in the liquid storing cavity 7-1a to determine whether cigarette liquid refill or replace is needed.

The atomizing assembly 17a includes an atomizing head 10a, an atomizing tube 11a, a gas inlet tube 12a, an unlocking member 13a, a gas inlet and outlet separating tube 14a, and a blocking member 18a. The lower end of the gas inlet tube 12a is detachably connected to the atomizing head 10a via, specifically, a threaded connection. An unlocking member 13a is sleeved on the outer side of the upper end of the gas inlet tube 12a. The blocking member 18a is sleeved on the outer side of the gas inlet tube 12a, and is disposed between the gas inlet tube 12a and the unlocking member 13a. The inner side of the upper end of the gas inlet tube 12a is disposed with internal threads. The gas inlet and outlet separating tube 14a is accordingly disposed with external threads adapted to the internal threads of the upper end of the gas inlet tube 12a. The gas inlet tube 12a and the gas inlet and outlet separating tube 14a are connected by the internal threads and external threads, that is, the gas inlet tube 12a is sleeved through its internal threads over the outside of the gas inlet and outlet separating tube 14a. The end of the gas inlet and outlet separating tube 14a located within the gas inlet tube 12a is tightly fitted with the atomizing tube 11a, and the end of the gas inlet and outlet separating tube 14a away from the atomizing tube 11a is connected to the cigarette holder 15a. Specifically, the atomizing tube 11a is on one end in communication with the atomizing head 10a while on another end in tight fit with the gas inlet and outlet separating tube 14a, so that the smoke formed in the atomizing head 10a can be inhaled by the user from the atomizing tube 11a through the gas inlet and outlet separating tube 14a. The blocking member 18a is made of elastic material. In this embodiment, the blocking member 18a is made of rubber or silicone material. A blocking member 18a made of such material can be both flexible and reliable, and can be used for a relatively extended period of time without prematurely aging.

Further, the gas inlet and outlet separating tube 14a is disposed with a mounting hole 14-1a, into which one end of the cigarette holder 15a is inserted to facilitate the user to replace the cigarette holder 15a.

The gas inlet tube 12a is disposed with a stop boss 12-1a. The blocking member 18a is disposed with a blocking groove 18-1a adapted to the stop boss 12-1a. An unlocking member 13a is disposed with a stop groove 13-1a. By depressing the unlocking member 13a and applying pressure on the blocking member 18a, the blocking member 18a will be flattened. Since the blocking member 18a has become thinner, the spacing between the stop boss 12-1a and the stop groove 13-1a is reduced, and the stop groove 13-1a and the stop boss 12-1a are engaged with each other. At this time, the electronic cigarette is in an unlockable state. Being in the unlockable state means: if the pressure continues and other forces such as rotational forces, are brought in, the atomizing assembly 17a can be driven to be separated from other parts of the electronic cigarette, such as the main body portion 16a, enabling actions such as refilling the cigarette liquid or replacing the atomizing head. It can be known that the positions of the stop boss and the stop groove may alternatively be interchanged to bring about the same technical effects, which will not be repeated herein.

Specifically, when the electronic cigarette is in the locked state, the blocking groove 18-1a is sleeved on the stop boss 12-1a of the gas inlet tube 12a, and an upper portion of the blocking member 18a will protrude slightly over the stop boss 12-1a. At this time, if no downward force is applied onto the unlocking member 13a, the stop groove 13-1a will not be brought into contact with, let alone clamp to, the stop boss 12-1a, rotating the unlocking member 13a will never lead to separating the atomizing assembly 17a and the main body portion 16a. On the contrary, if a downward force is applied to the unlocking member 13a, rotating the unlocking member 13a will realize the separating. By providing the blocking groove 18-1a, the blocking member 18a can be sleeved on the stop boss 12-1a. Compared to placing the blocking member between the upper portion of the gas inlet tube 12a and the lower portion of the unlocking part 13a, the above configuration has the following advantages: 1) the length of the atomizing assembly 17a is reduced, improving the space utilization in the electronic cigarette (e.g., if the length of the electronic cigarette stays the same, a shorter atomizing assembly 17a would lead to a longer main portion 16a, allowing the main portion 16a to increase its capacity for storing liquid); 2) the user only needs to apply a relatively small force to the unlocking member 13a to unlock the electronic cigarette, facilitating the user to disassemble the atomizing assembly 17a.

It can be understood that, in other embodiments, the position of the stop boss 12-1a and the position of the stop groove 13-1a can be exchange, that is, the stop boss 12-1a is disposed on the unlocking member 13a while the stop groove 13-1a opposite to the stop boss 12-1a is disposed on the gas inlet tube 12a, and the blocking groove 18-1a is disposed to adapt to the stop boss 12-1a.

In this embodiment, the unlocking member 13a is an annular body and has the dual-function of unlocking and gas inlet adjusting. It can be understood that, according to practical requirements in production, the unlocking member 13a can have the unlocking function only, or can have other functions in addition to the unlocking function, where the other functions may include liquid inlet adjusting or the like.

Further, the circumferential side near the upper end of the gas inlet tube 12a forms a flange 12-2a that can prevent the blocking member 18a from moving downward while also acting as a shielding. A connecting portion 12-3a is formed between the lower end of the gas inlet tube 12a and the flange 12-2a, which has an outer diameter greater than that of the lower end of the gas inlet tube 12a. The outer circumference of the connecting portion 12-3a is disposed with connecting threads through which the atomizing assembly 17a is screwed to the main body portion 16a.

Further, a first electrical contact 10-1a is disposed at the bottom of the atomizing head 10a, and the atomizing assembly 17a is electrically connected to the main portion 16a through the first electrical contact 10-1a.

The main body portion 16a includes a battery assembly 3a and a liquid storing assembly 7a integrally disposed with the battery device 3a.

The liquid storing assembly 7a is disposed internally with a liquid storing cavity 7-1a. The gas inlet passage tube 12a extends partially into, and is accommodated in, the liquid storing cavity 7-1a, and the atomizing head 10a is also accommodated in the liquid storing cavity 7-1a. A second electrical contact 7-2a is disposed at the end of the liquid storing assembly 7a closer to the battery device 3a. When the atomizing assembly 17a is mounted on the main portion 16a, the second electrical contact 7-2a is electrically connected to the first electrical contact 10-1a. The liquid storing assembly 7a also includes a threaded ring 9a that is in interference fit with the battery device 3a. The threaded ring 9a is mated to the gas inlet tube 12a via threads, and is disposed at the upper end of the liquid storing cavity 7-1a. Through the threaded ring 9a, the battery assembly 3a and the atomizing assembly 17a may be screwed together.

The battery assembly 3a includes a housing 5a, a battery 19a accommodated in the housing 5a, a circuit board assembly holder 6a mounted in the housing 5a, a circuit board assembly 4a mounted on the circuit board assembly holder 6a, a battery pad 2a mounted at an end of the housing 5a, and a battery bottom cover 1 in interference fit with the housing 5a. The threaded ring 9a is mated to the gas inlet tube 12a via threads, connecting the main body portion 16a to the atomizing assembly 17a via threads.

It can be understood that in other embodiments, the battery assembly 3a and the liquid storing assembly 7a may be connected via threads or snapping means or the like.

During assembly, the breather tube 10 is in interference fit with the gas inlet and outlet separating tube 14a. One end of the cigarette holder 15a is inserted into the mounting hole 14-1a on the gas inlet and outlet separating tube 14a. The blocking member 18a is sleeved on the gas inlet tube 12a so that the blocking groove 18-1a may cling to the stop boss 12-1a. The unlocking member 13a is placed on the upper end of the gas inlet tube 12a. The gas inlet and outlet separating tube 14a is connected to the gas inlet tube 12a via threads, and the atomizing head 10a is connected to the gas inlet tube 12a via threads, thereby forming the atomizing assembly 17a. The threaded ring 9a is in interference fit with the housing 5a, the circuit board assembly 4a is mounted on the circuit board assembly holder 6a, and its leads are soldered to the battery assembly 3a and the liquid storing assembly 7a, respectively. After being soldered together, the circuit board assembly 4a, the circuit board assembly holder 6a and the liquid storing assembly 7a are fitted into the housing 5a, and then the battery 19a is placed in the tail of the battery assembly 3a. Finally, the battery bottom cover 1 is interference fitted with the housing 5a, completing the assembly of the main body portion 16a.

During use, when the atomizing assembly 17a needs to be unscrewed from the main body portion 16a, the unlocking member 13a is firstly pressed downward (i.e., in a direction towards the main body portion 16a) against the blocking member 18a so that the blocking member 18a is elastically deformed. After that, keep pressure on the unlocking member 13a so that the stop groove 13-1a is clings to the stop boss 12-1a. At this time, rotate the unlocking member 13a and the entire atomizing assembly 17a turns. That is, the electronic cigarette of the present application needs two operations, i.e., "pressing" and the "rotating", to act on the unlocking member 13a sequentially before the atomizing assembly 17a can be detached from the main body portion 16a. In this way, an adult user who has read the manual or other documentation to learn about the above operation steps should be well informed about how to separate the atomizing assembly 17a and the battery 2 to refill the liquid or replace the atomizing head 10a. The operations are simple because there is no need to disassemble the many parts of the electronic cigarette. As for children, since disassembling the atomizing assembly 17a requires more than a simple rotating or pressing, but a specific combination of the two operations applied to a specific part (i.e., the unlocking member 13a), which are impossible, or very difficult, for a small child to find out, thereby preventing the child from contacting or accidentally ingesting the cigarette liquid, offering good protection for children.

When the user stops the downward force exerted on the unlocking member 13a during the unlocking process, the blocking member 18a elastically recovers, separating the stop groove 13-1a from the stop boss 12-1a. At this time, no amount of rotation on the unlocking member 13a will enable detaching the atomizing assembly 17a from the main body portion 16a, thus returning the electronic cigarette to the locked state.

Embodiment 4

Referring to FIGS. 20-26, in an embodiment of the present application, an electronic cigarette includes an atomizing assembly 10b and a battery assembly 20b. The atomizing assembly 10b includes a gas inlet tube holder 11b, a gas outlet tube 12b, an atomizing head 13b and an adjusting ring 14b. The gas inlet tube holder 11b includes a gas inlet tube 111b and a gas inlet adjusting end 112b connected to an end of the gas inlet tube 111b. A channel of the gas inlet tube 111b is in communication with a channel of the gas inlet adjusting end 112b to form a passage of the gas inlet tube holder 11b. The gas outlet tube 12b is sleeved in the passage of the gas inlet tube holder 11b, separating the passage of the gas inlet tube holder 11b into a gas outlet passage 121b and a gas inlet passage 122b. The atomizing head 13b is connected to the gas inlet tube 111b at an end away from the gas inlet adjusting end 112b. The adjusting ring 14b is sleeved at the gas inlet adjusting end 112b. The battery assembly 20b includes a battery housing disposed with a liquid storing cavity and a battery disposed in the battery housing. The liquid storing cavity is used for containing cigarette liquid, and is disposed at a bottom with a battery polarity contact member 32b which is electrically connected to the battery. The atomizing assembly 10b is detachably mounted in the liquid storing cavity through the gas inlet tube holder 11b, and the atomizing head 13b is electrically connected to the battery polarity contact member 32b.

Further, in some embodiments, the gas inlet adjusting end 112b includes a gas inlet adjusting section whose tube wall is disposed with a gas inlet hole 1121b, where the adjusting ring 14b is provided on an annular wall with a adjusting hole 141b in communication with the gas inlet hole 1121b. The amount of gas entering into the gas inlet passage 112b can be adjusted by rotating or moving up and/or down the adjusting ring 14b.

Further, in some embodiments, the gas inlet tube holder 11b includes a connecting section disposed between the gas inlet tube 111b and the gas inlet adjusting end 112b. The connecting section is formed on an outer circumferential wall with external threads 1122b; and the liquid storing cavity is disposed at a top end opening with internal threads adapted to the external threads 1122b.

Further, in some embodiments, the battery housing includes a main housing 21b and an upper cover 221b. The main housing 21b has a containing cavity 214b in which the battery is assembled, and the containing cavity being capped by the upper cover 221b.

Further, in some embodiments, the main housing 21b is disposed inside with a liquid storing tube 215b, and includes a base plate 211b, side walls 212b oppositely disposed on the base plate 211b, and a connecting wall 213b connecting a side of two side walls 212b. A top end of the connecting wall 213b is lower than that of the side wall 212b; an upper portion of the connecting wall 213b is disposed with a top plate 216b which is connected to the two side walls 212b, and a liquid storing tube mounting space for mounting the liquid storing tube 215b is formed at the top end of the connecting wall 213b.

Further, in some embodiments, the battery assembly further includes a circuit board assembly, and retaining bars 217b are oppositely disposed on an inside of the two side walls 212b. The circuit board assembly includes a circuit board 31b and a battery dock 33b. The circuit board 31b is on one face abutted against the retaining bars 217b, and on another face fixedly connected to the battery dock 33b. The battery dock 33b is disposed on one face opposite to the circuit board 31b with a battery mounting space 331b.

Figure 27:
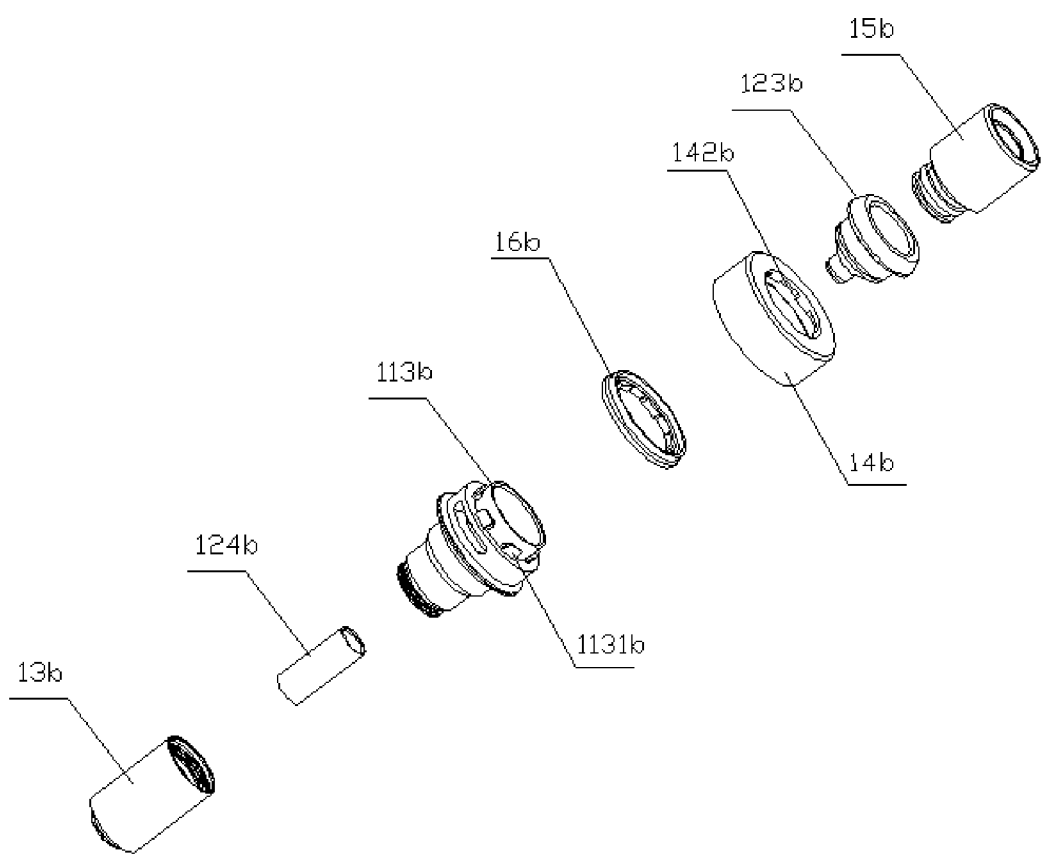
FIG. 27 is an exploded view of another preferred embodiment of an atomizing assembly of a convenient liquid-refillable electronic cigarette according to the present application.
Figure 28:
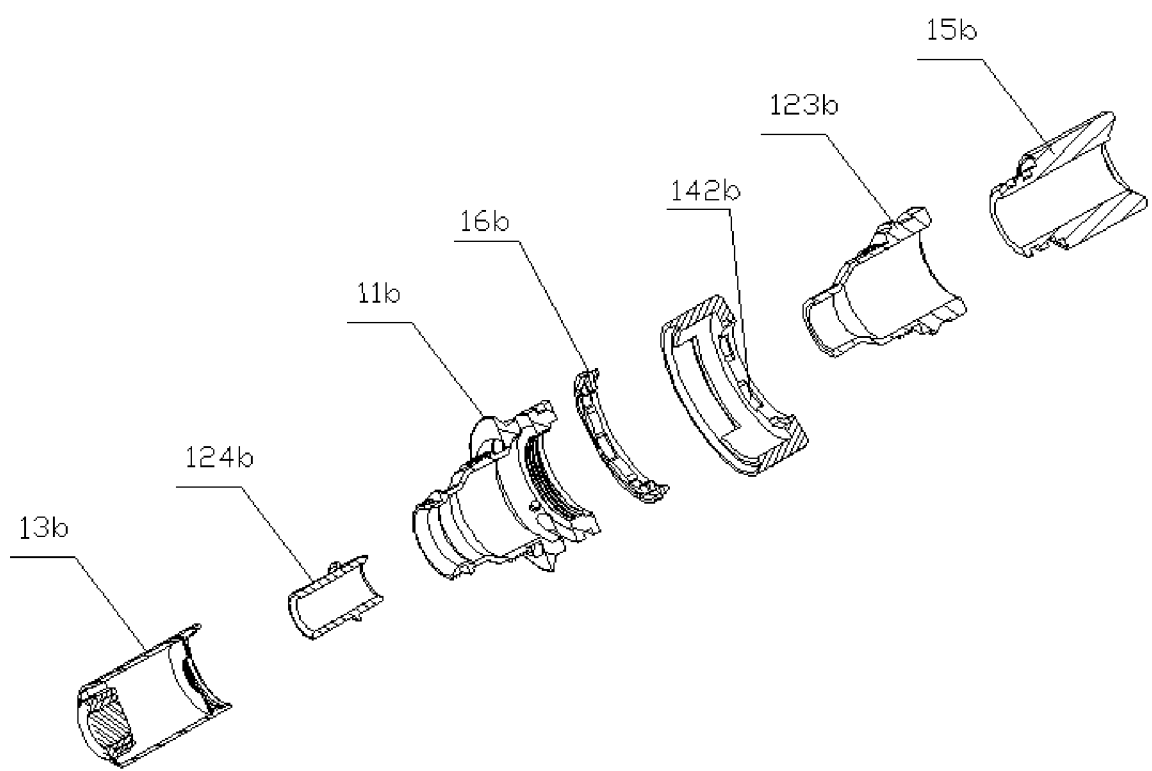
FIG. 28 is a sectional view of the atomizing assembly shown in FIG. 27.
Figure 29:
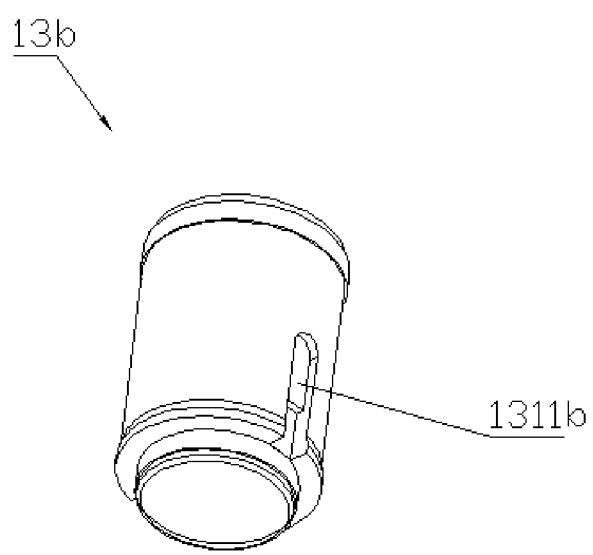
FIG. 29 is a perspective view of an atomizing head of the atomizing assembly of the electronic cigarette shown in FIG. 20.
Figure 30:
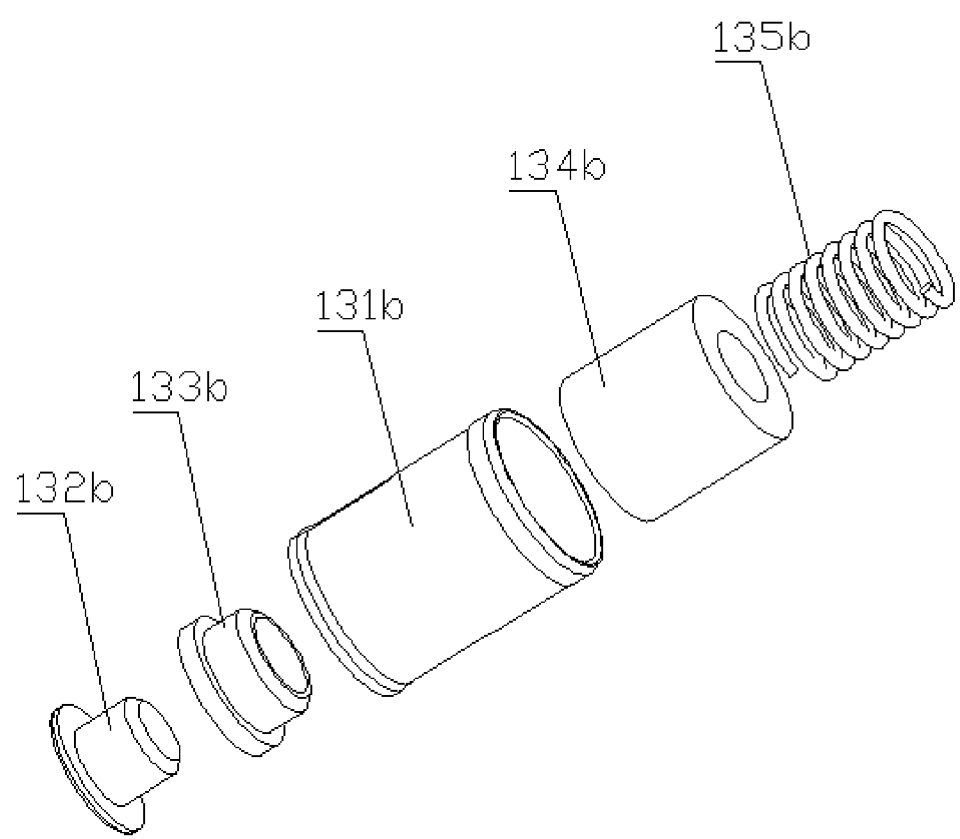
FIG. 30 is a dissembled view of the atomizing head shown in FIG. 29.
Figure 31:
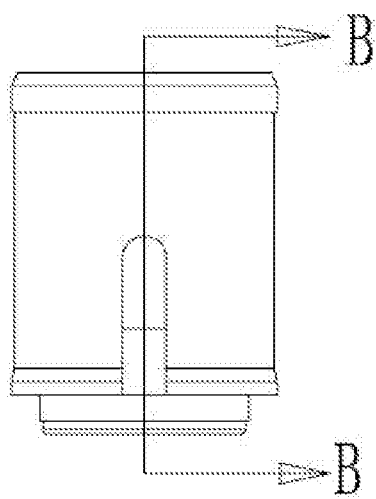
FIG. 31 is a primary view of the atomizing head shown in FIG. 29.
Figure 32:
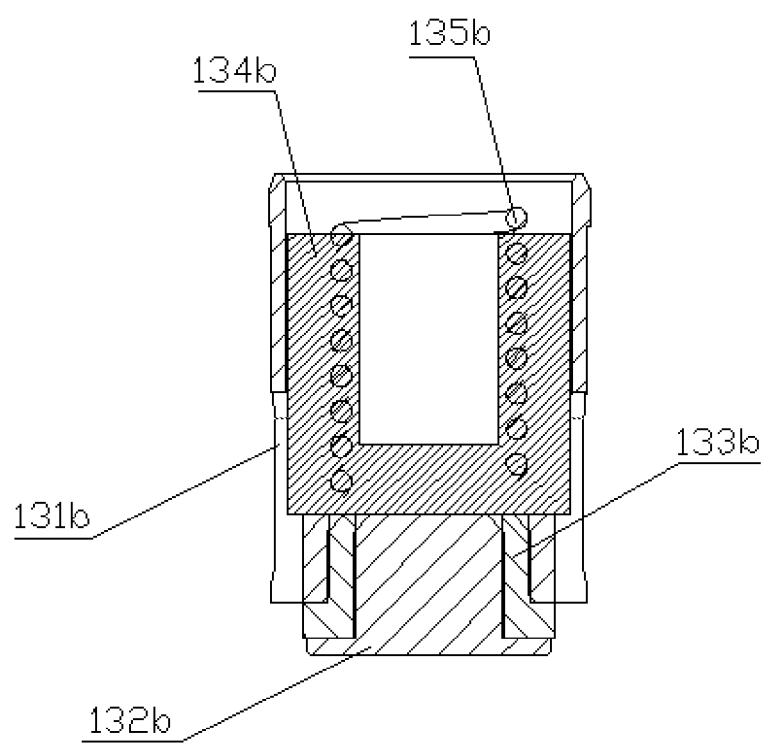
FIG. 32 is a sectional view along the direction B-B of the atomizing head shown in FIG. 31.

Referring to FIGS. 27 and 28, in a preferred embodiment of the present application, the gas inlet tube holder 11b is disposed on a top end with a stop ring 113b whose outer circumference is disposed with a stop boss 1131b protruding therefrom. The adjusting ring 14b is disposed on an inner circumferential wall with a stop groove 142b adapted to the stop boss 1131b; and the atomizing assembly 10b includes a rubber pad 16b which is elastically abutted against and held between the stop boss 1131b and the stop groove 142b.

Referring to FIGS. 29-32, in a preferred embodiment of the present application, the atomizing head 13b includes an atomizing head sleeve 131b, a positive pole contacting member 132b, a positive pole insulating pad 133b, a liquid absorbing member 134b and a heating member 135b. The positive pole contacting member 132b is sleeved at one end of the atomizing head sleeve 131b, and is insulatively isolated from the atomizing head sleeve 131b by the positive pole insulating pad 133b. The liquid absorbing member 134b is disposed within the atomizing head sleeve 131b. The heating member 135b is mounted within the atomizing head sleeve 131b. The heating member 135b is connected on one end to the atomizing head sleeve 131b, and on another end to the positive pole contact member 132b.

Further, in some embodiments, the heating member 135b and the liquid absorbing member 134b are integrally formed.

Further, in some embodiments, the liquid absorbing member 134b is a ceramic heating rod which is made of a porous ceramic material.

The above-mentioned embodiments merely represent several implementations of the present application, and the descriptions thereof are more specific and detailed, but they should not be understood as a limitation on the scope of the present application. It should be noted that, for those of ordinary skill in the art, various variations and improvements may still be made without departing from the concept of the present application, and all of which shall fall into the protection scope of the present application. Therefore, the scope of protection of the present application shall be subject to the appended claims.

What is claimed is:

1. An electronic cigarette, comprising a battery device and an atomizing device, wherein the battery device comprises a liquid storing assembly, a housing with an accommodating inner cavity, and a power supply assembly disposed in the accommodating inner cavity, wherein the liquid storing assembly comprises a liquid storing base and a liquid storing tube, the liquid storing base comprises a fixed end and an open end opposite to the fixed end, the fixed end is disposed to be fixedly connected within the accommodating inner cavity, the open end extends out of the accommodating inner cavity, and a bottom end of the liquid storing tube is pluggably sleeved on the open end, an end of the atomizing device is allowed to be inserted from a top end of the liquid storing tube into the liquid storing tube and be detachably connected to the open end.

2. The electronic cigarette according to claim 1, wherein the atomizing device comprises an upper cover, a connecting tube and an atomizing head, wherein the upper cover is detachably capped at the top end of the liquid storing tub, wherein one end of the connecting tube is detachably connected on the upper cover and another end of the connecting tube is detachably connected to the open end, and the atomizing head is sleeved within the connecting tube.

3. The electronic cigarette according to claim 2, wherein the connecting tube is disposed, on one end connected to the open end, with external threads, and an inner circumferential surface of the top end of the open end extends inward to form a connecting portion whose inner diameter adapted to an outer diameter of the connecting tube, and an inner circumferential surface of the connecting portion is disposed with inner threads adapted to the external threads of the connecting tube.

4. The electronic cigarette according to claim 2, further comprising a gas adjusting part which comprises a breather tube and a gas adjusting ring, wherein one end of the breather tube is inserted into the upper cap; the gas adjusting ring is rotatably sleeved on an outer circumference of another end of the breather pipe, and is disposed on a side wall with a gas-adjusting groove; and the upper cover is disposed with a gas inlet hole which is communicatively aligned or un-aligned with the gas-adjusting groove.

5. An electronic cigarette, comprising an atomizing assembly and a battery assembly, wherein the atomizing assembly comprises a gas inlet tube holder, a gas outlet tube, an atomizing head and an adjusting ring, wherein the gas inlet tube holder comprises a gas inlet tube and a gas inlet adjusting end connected to an end of the gas inlet tube; a channel of the gas inlet tube is in communication with a channel of the gas inlet adjusting end to form a passage of the gas inlet tube holder; the gas outlet tube is sleeved in the passage of the gas inlet tube holder, separating the passage of the gas inlet tube holder into a gas outlet passage and a gas inlet passage; the atomizing head is connected to the gas inlet tube at an end away from the gas inlet adjusting end; the adjusting ring is sleeved at the gas inlet adjusting end, the battery assembly comprises a battery housing disposed with a liquid storing cavity and a battery disposed in the battery housing, wherein the liquid storing cavity is used for containing cigarette liquid, and is disposed at a bottom with a battery polarity contact member which is electrically connected to the battery; the atomizing assembly is detachably mounted in the liquid storing cavity through the gas inlet tube holder, and the atomizing head is electrically connected to the battery polarity contact member.

6. The electronic cigarette according to claim 5, wherein the gas inlet adjusting end comprises a gas inlet adjusting section whose tube wall is disposed with a gas inlet hole, wherein the adjusting ring is provided on an annular wall with a adjusting hole in communication with the gas inlet hole, wherein the amount of gas entering into the gas inlet passage can be adjusted by rotating or moving up and/or down the adjusting ring.

7. The electronic cigarette according to claim 5, wherein the gas inlet tube holder comprises a connecting section disposed between the gas inlet tube and the gas inlet adjusting end, wherein the connecting section is formed on an outer circumferential wall with external threads; and the liquid storing cavity is disposed at a top end opening with internal threads adapted to the external threads.

8. The electronic cigarette according to claim 5, wherein the battery housing comprises a main housing and an upper cover, wherein the main housing has a containing cavity in which the battery is assembled, and the containing cavity being capped by the upper cover.

9. The electronic cigarette according to claim 8, wherein the main housing is disposed inside with a liquid storing tube, and comprises a base plate, side walls oppositely disposed on the base plate, and a connecting wall connecting a side of two side walls, wherein a top end of the connecting wall is lower than that of the side wall; an upper portion of the connecting wall is disposed with a top plate which is connected to the two side walls, and a liquid storing tube mounting space for mounting the liquid storing tube is formed at the top end of the connecting wall.

10. The electronic cigarette according to claim 9, wherein the battery assembly further comprises a circuit board assembly, retaining bars are oppositely disposed on an inside of the two side walls, wherein the circuit board assembly comprises a circuit board and a battery dock, wherein the circuit board is on one face abutted against the retaining bars, and on another face fixedly connected to the battery dock, wherein the battery dock is disposed on one face opposite to the circuit board with a battery mounting space.

11. The electronic cigarette according to claim 5, wherein the gas inlet tube holder is disposed on a top end with a stop ring whose outer circumference is disposed with a stop boss protruding therefrom, wherein the adjusting ring is disposed on an inner circumferential wall with a stop groove adapted to the stop boss; and the atomizing assembly comprises a rubber pad which is elastically abutted against and held between the stop boss and the stop groove.

12. The electronic cigarette according to claim 5, wherein the atomizing head comprises an atomizing head sleeve, a positive pole contacting member, a positive pole insulating pad, a liquid absorbing member and a heating member, wherein the positive pole contacting member is sleeved at one end of the atomizing head sleeve, and is insulatively isolated from the atomizing head sleeve by the positive pole insulating pad; the liquid absorbing member is disposed within the atomizing head sleeve; the heating member is mounted within the atomizing head sleeve; and the heating member is connected on one end to the atomizing head sleeve, and on another end to the positive pole contact member.

13. The electronic cigarette according to claim 12, wherein the heating member and the liquid absorbing member are integrally formed.

14. The electronic cigarette according to claim 13, wherein the liquid absorbing member is a ceramic heating rod which is made of a porous ceramic material.

* * * * *